US 8,636,616 B1
Jan. 28, 2014

(12) United States Patent
Langenfeld

(10) Patent No.: US 8,636,616 B1
(45) Date of Patent: Jan. 28, 2014

(54) DRIVE ASSEMBLY

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 13/913,949

(22) Filed: Jun. 10, 2013

Related U.S. Application Data

(62) Division of application No. 13/678,966, filed on Nov. 16, 2012, now Pat. No. 8,479,418, which is a division of application No. 12/717,709, filed on Mar. 4, 2010, now Pat. No. 8,313,408.

(60) Provisional application No. 61/288,673, filed on Dec. 21, 2009, provisional application No. 61/233,026, filed on Aug. 11, 2009.

(51) Int. Cl.
*F16H 48/20* (2012.01)

(52) U.S. Cl.
USPC ............ 475/249; 475/230; 475/231; 475/248

(58) Field of Classification Search
USPC .................................. 475/230, 231, 248, 249
See application file for complete search history.

(56) References Cited

U.S. PATENT DOCUMENTS

| | | | |
|---|---|---|---|
| 1,338,777 A | 5/1920 | Johnson | |
| 1,386,396 A | 8/1921 | Cornelison | |
| 2,578,584 A | 12/1951 | Osborn | |
| 2,692,516 A | 10/1954 | O'Leary | |
| 3,360,933 A | 1/1968 | Swanson et al. | |
| 3,424,032 A | 1/1969 | Ritter | |
| 3,435,928 A | 4/1969 | Horning | |
| 3,486,335 A | 12/1969 | Kern et al. | |
| 3,817,403 A | 6/1974 | Glachet et al. | |
| 4,589,249 A | 5/1986 | Walker et al. | |
| 4,658,662 A | 4/1987 | Rundle | |
| 5,099,936 A | 3/1992 | Irikura et al. | |
| 5,201,692 A | 4/1993 | Johnson et al. | |
| 5,314,387 A | 5/1994 | Hauser | |
| 5,392,670 A | 2/1995 | Hauser | |
| 5,540,119 A | 7/1996 | Hudson | |
| 5,544,547 A | 8/1996 | Ishimaru | |
| 5,697,264 A | 12/1997 | Andrews et al. | |

(Continued)

OTHER PUBLICATIONS

Unpublished U.S. Appl. No. 13/913,893, filed Jun. 10, 2013.

(Continued)

*Primary Examiner* — Derek D Knight

(74) *Attorney, Agent, or Firm* — Neal, Gerber & Eisenberg LLP

(57) ABSTRACT

A variable speed transaxle is disposed in a transaxle housing and drives a pair of axle shafts. A pair of clutch assemblies using a plurality of gears may be engaged to the axle shafts to selectively engage and drive each axle shaft. Each clutch assembly uses a ring gear having planet gears running on a gear form, a planet carrier for the planet gears engaged to the axle shaft, a first clutch dog selectively engageable to a first engagement structure to prevent rotation of the ring gear; and a second clutch dog selectively engageable to a second engagement structure to prevent rotation of the planet carrier and thereby provide a braking force to the axle shaft.

21 Claims, 22 Drawing Sheets

(56) References Cited

U.S. PATENT DOCUMENTS

| | | | | |
|---|---|---|---|---|
| 5,947,218 | A | 9/1999 | Ishimaru | |
| 6,098,385 | A | 8/2000 | Turk | |
| 6,266,598 | B1 | 7/2001 | Pilar et al. | |
| 6,457,546 | B1 | 10/2002 | Ishimaru et al. | |
| 6,575,868 | B1 * | 6/2003 | Keusch et al. | 475/249 |
| 6,643,959 | B2 | 11/2003 | Jolliff et al. | |
| 6,651,529 | B1 | 11/2003 | Poplawsli et al. | |
| 6,986,406 | B1 | 1/2006 | Hauser et al. | |
| 7,059,991 | B2 | 6/2006 | Puiu | |
| 7,073,330 | B1 | 7/2006 | Hauser | |
| 7,077,778 | B1 * | 7/2006 | Irikura | 475/230 |
| 7,089,824 | B2 | 8/2006 | Nakatani et al. | |
| 7,137,250 | B1 | 11/2006 | McCoy et al. | |
| 7,222,485 | B2 | 5/2007 | Shibata et al. | |
| 7,225,704 | B2 | 6/2007 | Ishii et al. | |
| 7,338,403 | B2 | 3/2008 | Puiu | |
| 7,357,750 | B2 | 4/2008 | Okada | |
| 7,367,353 | B1 | 5/2008 | Langenfeld et al. | |
| 7,455,130 | B2 | 11/2008 | Irikura | |
| 7,487,608 | B2 | 2/2009 | Yamazaki et al. | |
| 7,493,711 | B2 | 2/2009 | Gautreau et al. | |
| 7,503,172 | B2 | 3/2009 | Sakakura et al. | |
| 7,540,102 | B2 * | 6/2009 | Olmr et al. | 37/245 |
| 7,577,507 | B2 | 8/2009 | Morris | |
| 7,788,919 | B2 | 9/2010 | Ohashi et al. | |
| 7,841,176 | B1 | 11/2010 | Langenfeld et al. | |
| 7,913,799 | B2 | 3/2011 | Kawashiri et al. | |
| 7,926,624 | B1 | 4/2011 | Taylor | |
| 7,927,245 | B1 | 4/2011 | Langenfeld et al. | |
| 7,988,582 | B1 | 8/2011 | Hauser | |
| 8,046,992 | B2 | 11/2011 | Abend et al. | |
| 8,161,834 | B2 | 4/2012 | Steffens | |
| 8,251,868 | B2 | 8/2012 | Ichikawa et al. | |
| 8,313,405 | B2 | 11/2012 | Bazyn et al. | |
| 8,313,407 | B2 | 11/2012 | Ekonen et al. | |
| 8,313,408 | B1 | 11/2012 | Langenfeld | |
| 8,393,236 | B1 | 3/2013 | Hauser et al. | |
| 8,464,610 | B1 | 6/2013 | Langenfeld et al. | |
| 8,479,418 | B1 * | 7/2013 | Langenfeld | 37/244 |
| 8,534,060 | B1 * | 9/2013 | Bennett et al. | 60/458 |
| 2007/0209456 | A1 | 9/2007 | Irikura et al. | |
| 2008/0018267 | A1 | 1/2008 | Arakawa et al. | |
| 2008/0018269 | A1 | 1/2008 | Wyatt et al. | |
| 2008/0041048 | A1 | 2/2008 | Kanenobu et al. | |
| 2010/0147097 | A1 | 6/2010 | Kim et al. | |
| 2012/0297757 | A1 | 11/2012 | Kamikawa | |

OTHER PUBLICATIONS

Unpublished U.S. Appl. No. 12/853,978, filed Aug. 10, 2010.

* cited by examiner

US 8,636,616 B1

DRIVE ASSEMBLY

CROSS-REFERENCE

This application is a divisional of U.S. application Ser. No. 13/678,966 filed on Nov. 16, 2012, which is a divisional of U.S. application Ser. No. 12/717,709 filed on Mar. 4, 2010, now U.S. Pat. No. 8,313,408, which claims the benefit of U.S. Provisional Application No. 61/288,673 filed on Dec. 21, 2009 and U.S. Provisional Application No. 61/233,026 filed on Aug. 11, 2009. The terms of all of the foregoing applications are incorporated by reference in their entirety.

BACKGROUND OF THE INVENTION

This invention relates to a drive assembly incorporating a variable speed transmission for use in driving a vehicle or other apparatus, such as a walk-behind snow thrower or brush cutter.

SUMMARY OF THE INVENTION

An improved drive assembly is disclosed herein, as disclosed in more detail below, including a variable speed transmission and specifically a hydrostatic transaxle used to power both output axles and a power take-off ("PTO") assembly.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
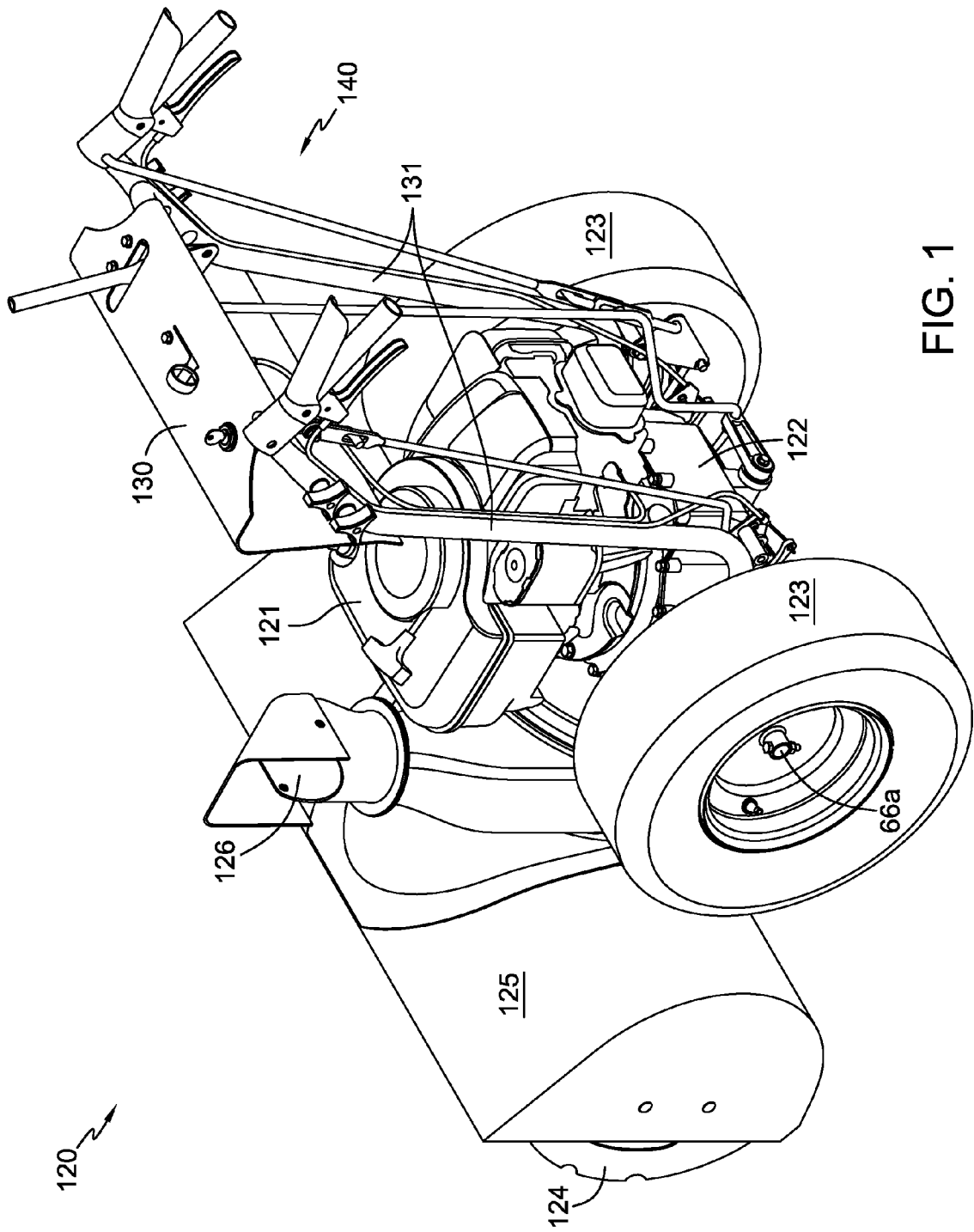
FIG. 1 is a perspective view of a snow thrower incorporating a first embodiment of a drive assembly in accordance with the present invention.
Figure 2:
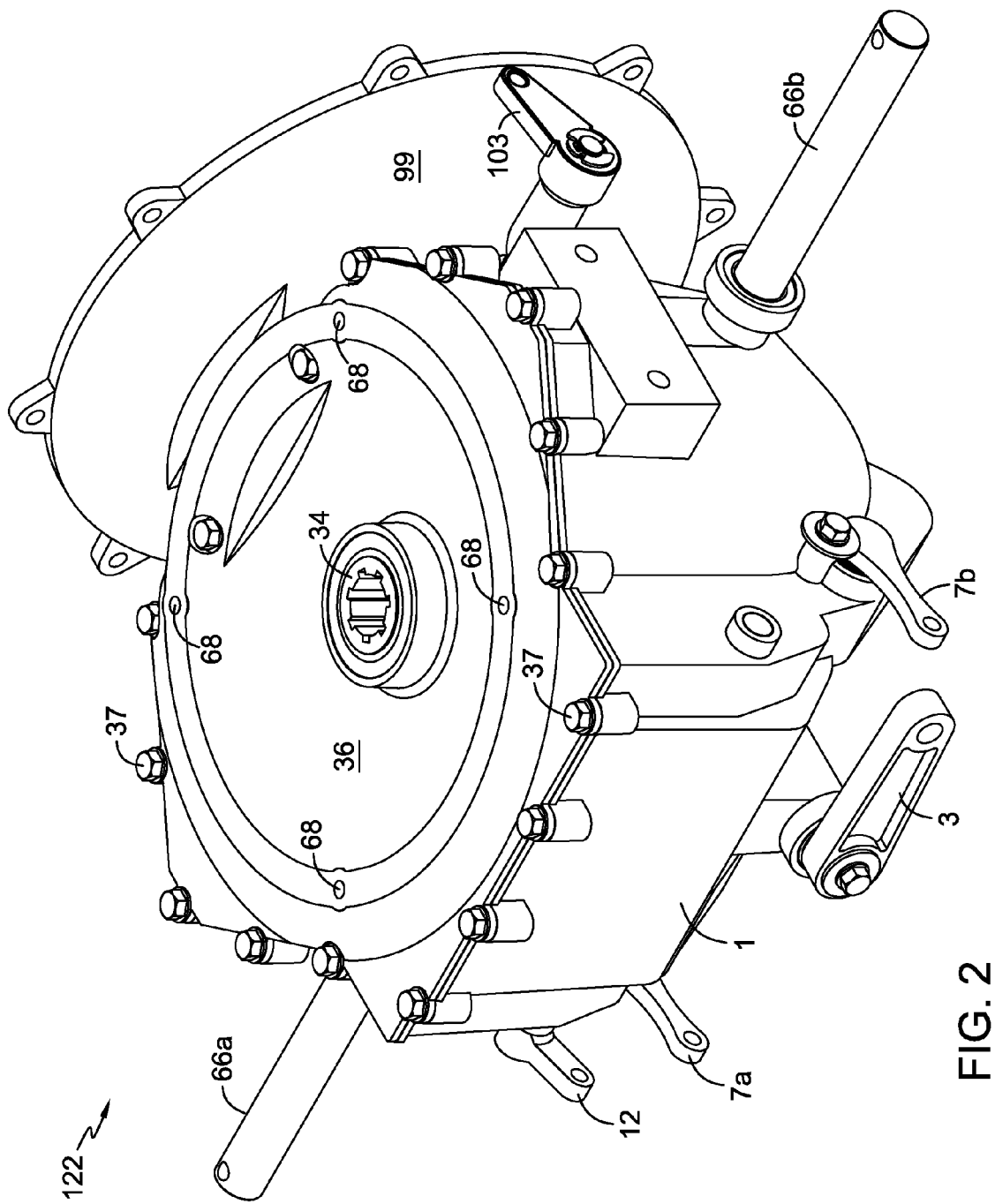
FIG. 2 is a top perspective view of the drive assembly of FIG. 1.
Figure 3:
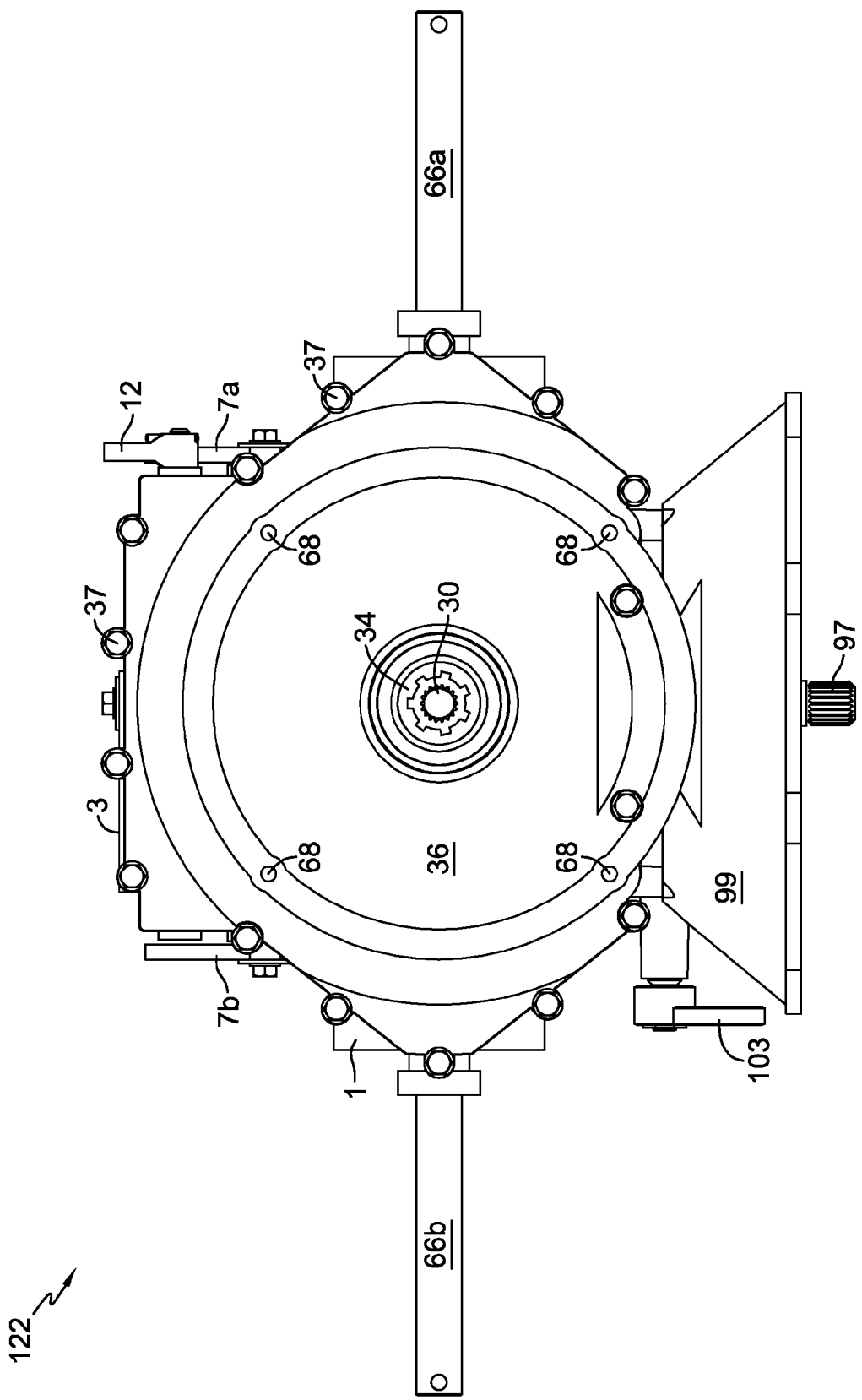
FIG. 3 is a top plan view of the drive assembly of FIG. 2.
Figure 4:
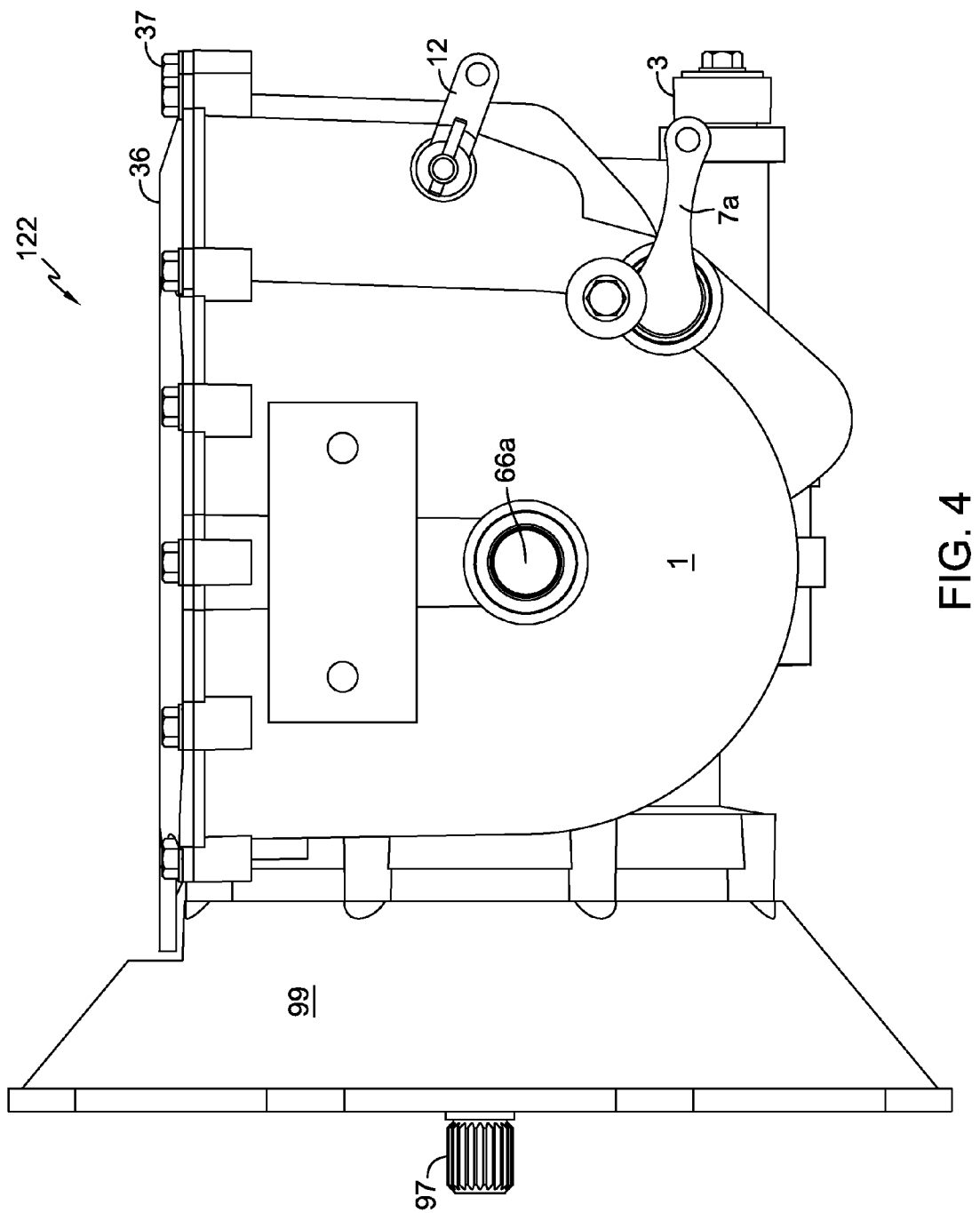
FIG. 4 is a side elevational view of the drive assembly of FIG. 2.
Figure 5:
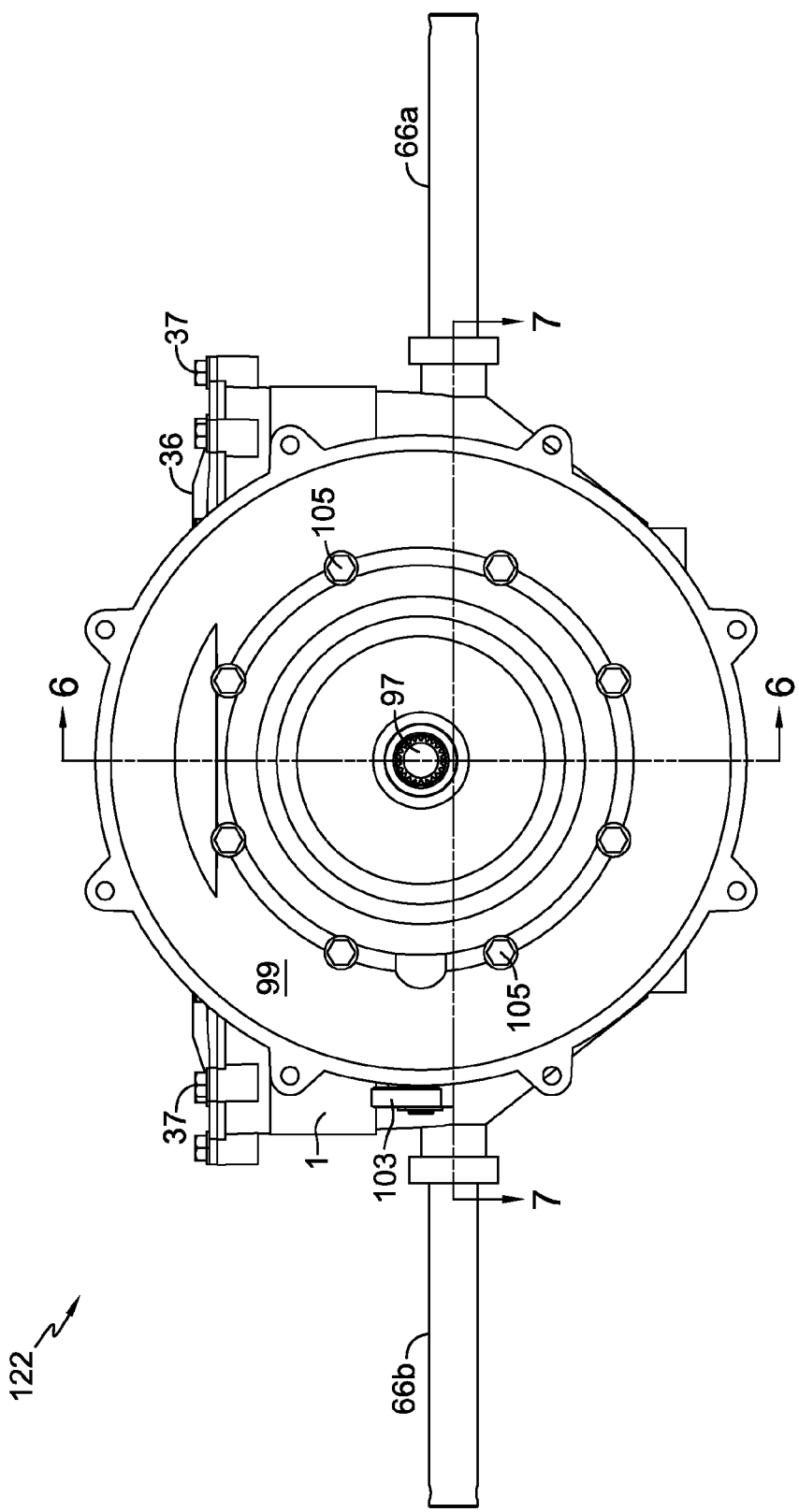
FIG. 5 is a front elevational view of the drive assembly of FIG. 2.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Certain elements that are similar to other elements but used on different sides of the drive apparatus may be labeled using "a" and "b" in addition to the reference numeral where such labeling assists in understanding the disclosure. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art. Furthermore, as used herein, the terms "vertical" and "horizontal" are applied with respect to the ground and may be approximate.

Vehicle 120, shown in FIG. 1 as a snow thrower, includes a prime mover 121 and a first embodiment variable speed transaxle 122 having an integral PTO assembly driving an auger 124 used to a blower device including scoop 125 and discharge chute 126. Prime mover 121 could be an internal combustion engine, electric motor or the like. Variable speed transaxle 122 is shown herein as a hydrostatic transaxle incorporating an axial piston pump and axial piston motor. Hydrostatic transaxles of this type are described generally in, e.g., commonly-owned U.S. Pat. No. 5,314,387. A hydrostatic transaxle design used in a snow thrower is shown in commonly-owned U.S. Pat. No. 6,651,529. The terms of both of these patents are incorporated herein by reference.

Vehicle 120 includes wheels 123 driven by output axle shafts 66a, 66b. A control panel 130 mounted on operator handle(s) 131 is connected to various linkages 140 to control the output of transaxle 122 and vehicle 120 in general. A benefit of the drive assembly disclosed herein is that it eliminates the need for a separate frame for the vehicle, but instead uses the external housing of transaxle 122 to support the various elements, thereby providing a compact design. Although attachment of operator handle 131 to transaxle 122 is not visible in FIG. 1, handle 131 may be attached directly to the external housing of transaxle 122 in the same manner as is shown in second embodiment FIG. 15, which illustrates the attachment of handle 131 directly to the external housing of transaxle 222 via fasteners 132.

As shown in FIGS. 2-5, the external housing of transaxle 122 comprises a main housing 1 and a cover 36 fastened together along a split line parallel to axle shafts 66a, 66b by means of fasteners 37. A PTO cover 99 is also secured to main housing 1 along a split line perpendicular to PTO shaft 97 by means of fasteners 105. PTO shaft 97 is oriented perpendicular to axle shafts 66a, 66b. Prime mover 121 is secured directly to cover 36 by means of fasteners secured through a mounting flange of prime mover 121 to mounting holes 68 in cover 36. Other components of vehicle 120 can be similarly secured to main housing 1, cover 36, or PTO cover 99.

The inner workings and arrangement of transaxle 122 are seen in FIGS. 6-14. Motor and center section assembly 40 can be seen most clearly in FIGS. 19-22, while the center section assembly with motor components removed can be seen in FIGS. 23-26.

A vertical output drive component such as an output shaft (not shown) of prime mover 121 enters transaxle 122 through cover 36 and engages an input tube 34 which drives both pump shaft 30 and a first bevel gear 33. Input tube 34 is partially supported by cover 36 and partially supported by its engagement with pump shaft 30, which is supported by center section 26.

From its centralized location in transaxle 122, center section 26 either directly or indirectly supports at least one end of all motive power shafts of transaxle 122, including indirectly supported input tube 34 and directly supported pump shaft 30, motor shaft 46, PTO shaft 97, and axle shafts 66a, 66b. As shown in, e.g., FIGS. 7, 21 and 25, a pair of bearing openings 22a, 22b are provided on opposite sides of center section 26 so that the internal ends of axle shafts 66a, 66b are both rotatably supported within center section 26. Axle shafts 66a, 66b may be constrained as shown with spring pins 27 that are inserted into openings 26c in center section 26 to prevent or limit axial movement of axle shafts 66a, 66b.

As is known in the hydraulic arts, one or more housing elements may form an internal sump 55 that may provide fluid to lubricate various elements located in sump 55 and may provide the hydraulic fluid for the hydraulic pump, hydraulic motor, and other hydraulic elements of transaxle 122.

Because the fluid in sump 55 can expand or contract with changes in temperature, it is usually desirable to provide a vent (not shown) for sump 55.

Figure 6:
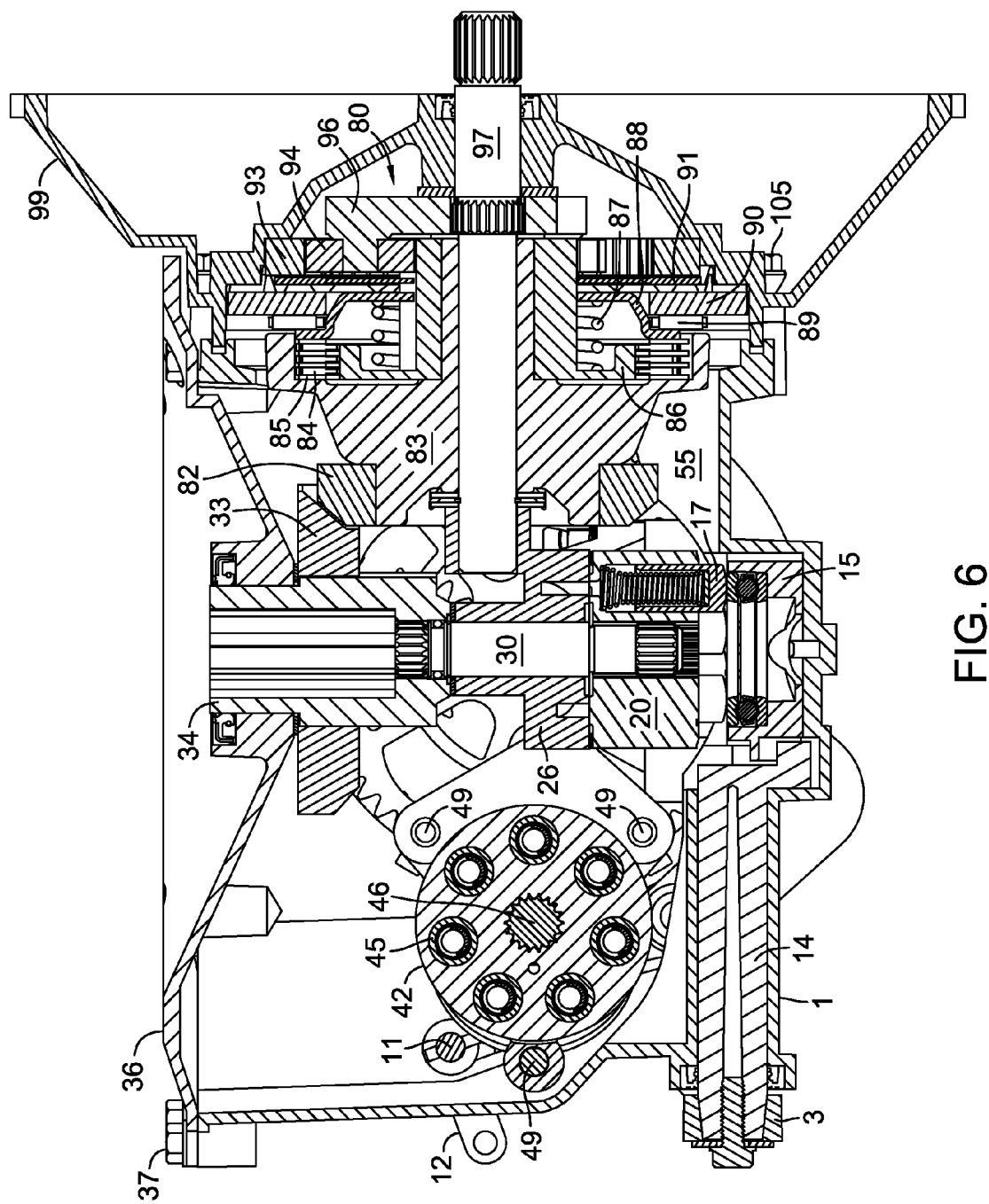
FIG. 6 is a cross-sectional view of the drive assembly of FIG. 2, along the line 6-6 in FIG. 5.
Figure 7:
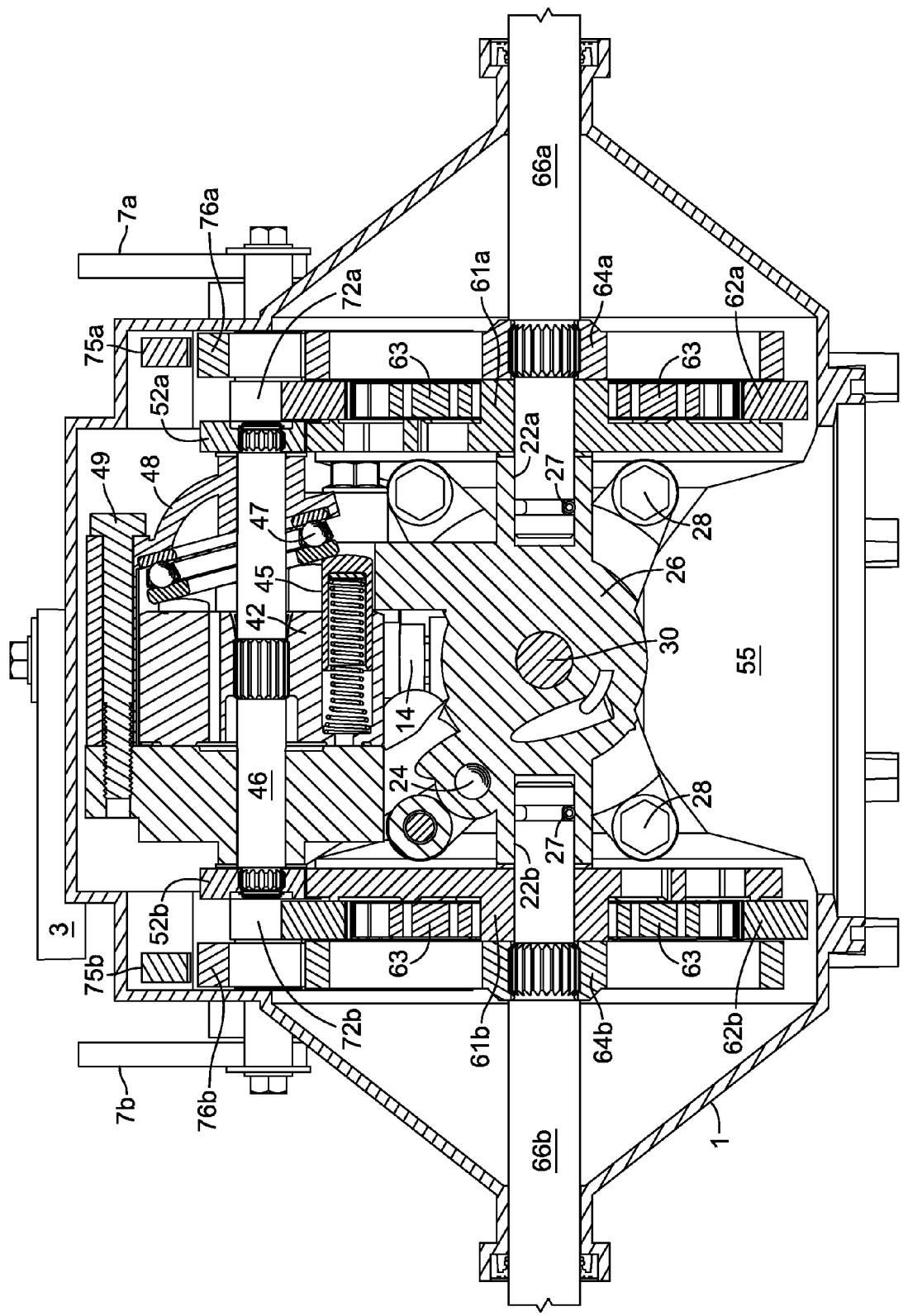
FIG. 7 is a cross-sectional view of the drive assembly of FIG. 2, along the line 7-7 in FIG. 5, with the PTO components and PTO cover removed.
Figure 8:
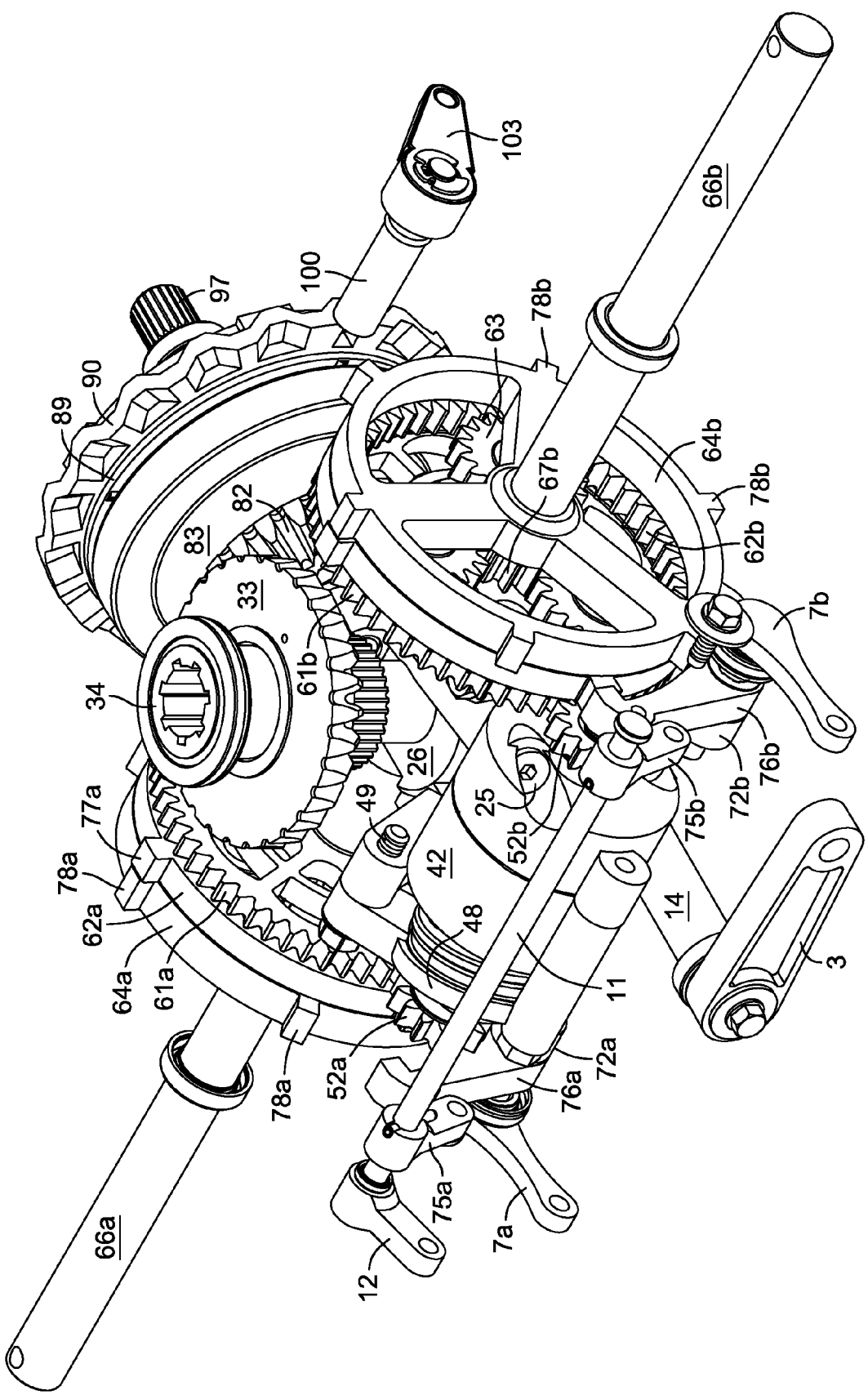
FIG. 8 is a top perspective view of the drive assembly of FIG. 2, similar to FIG. 2, but with the external housings removed.
Figure 9:
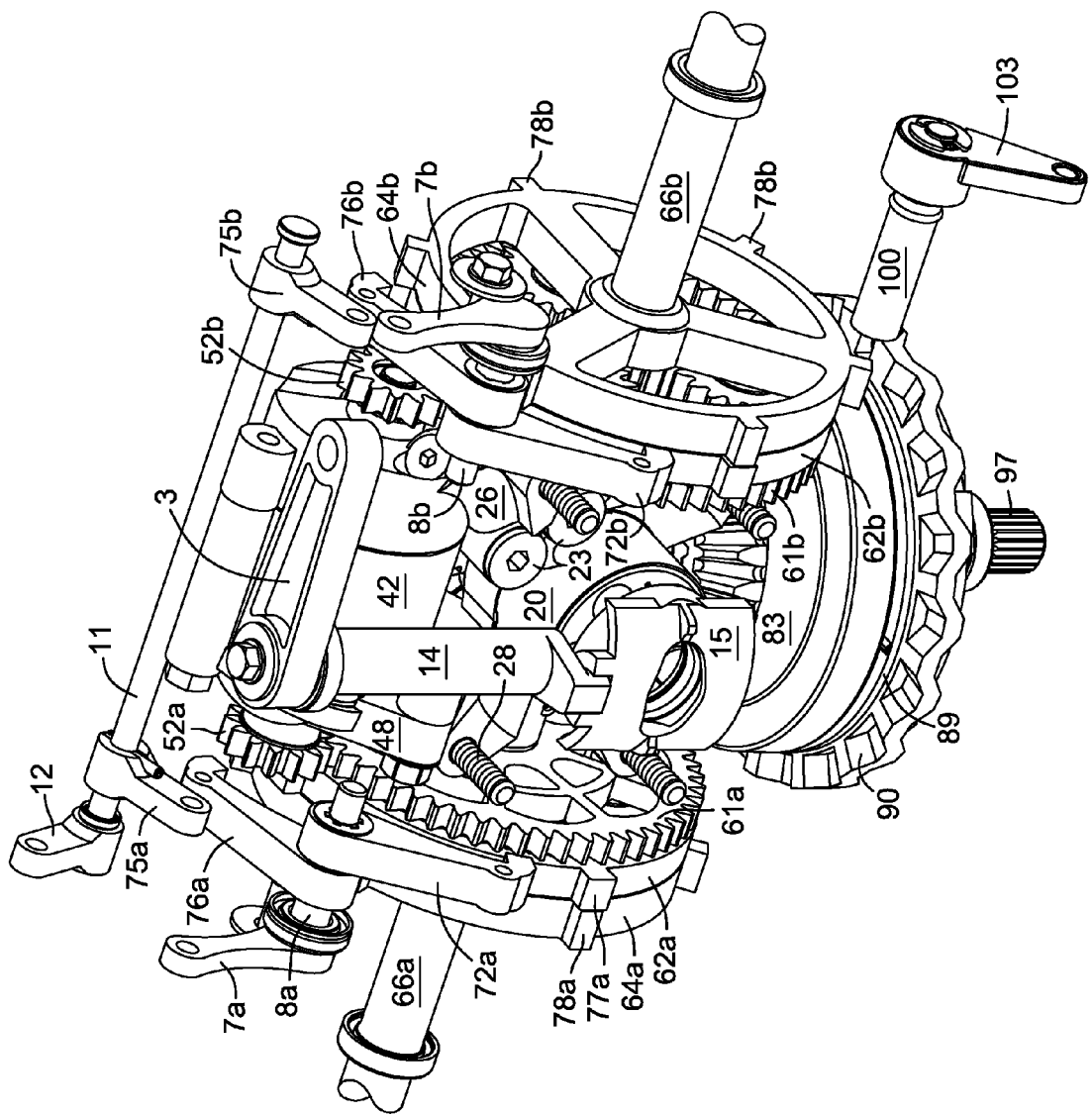
FIG. 9 is a bottom perspective view of the drive assembly of FIG. 2, with the external housings removed.
Figure 10:
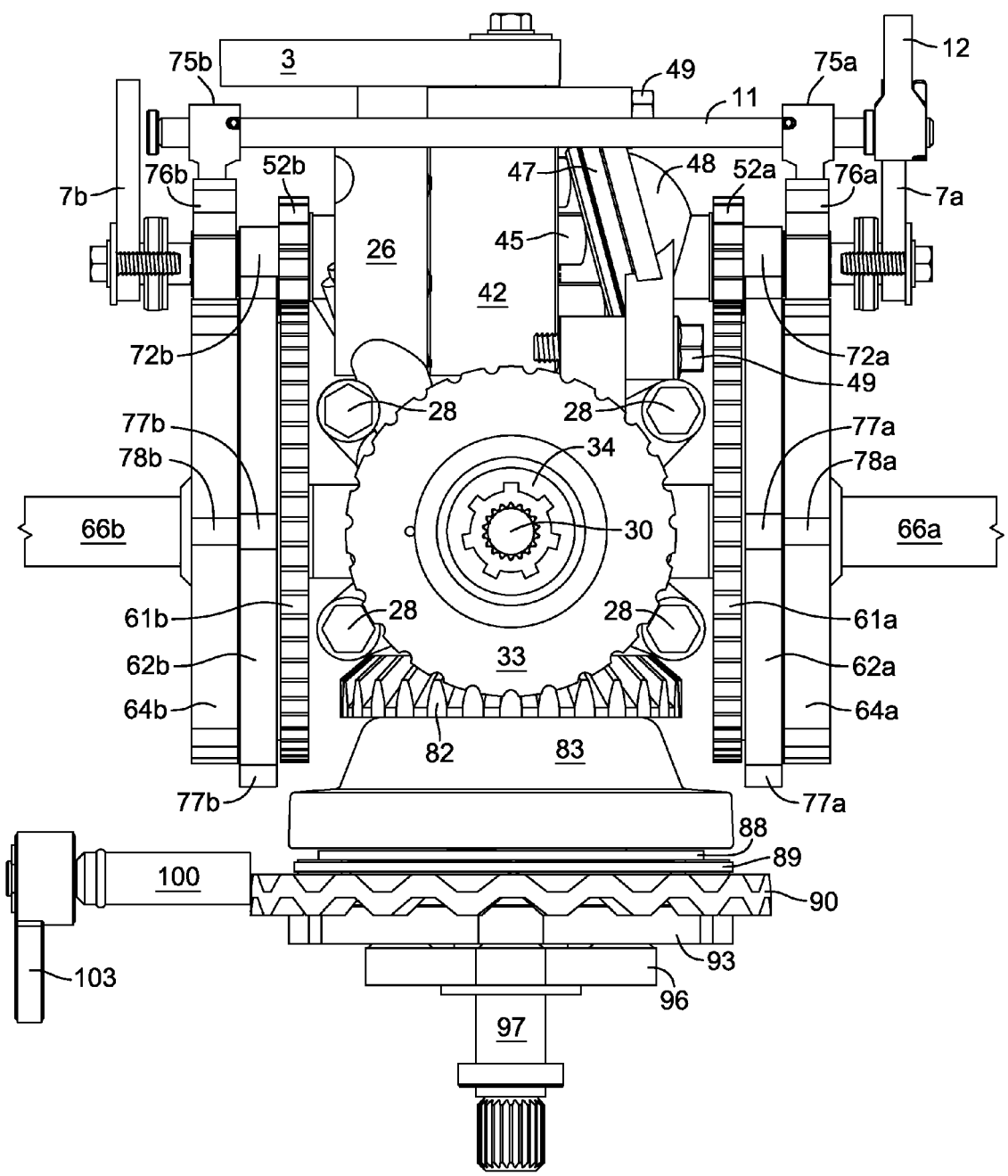
FIG. 10 is a top plan view of the drive assembly of FIG. 2, similar to FIG. 3, but with the external housings removed.
Figure 11:
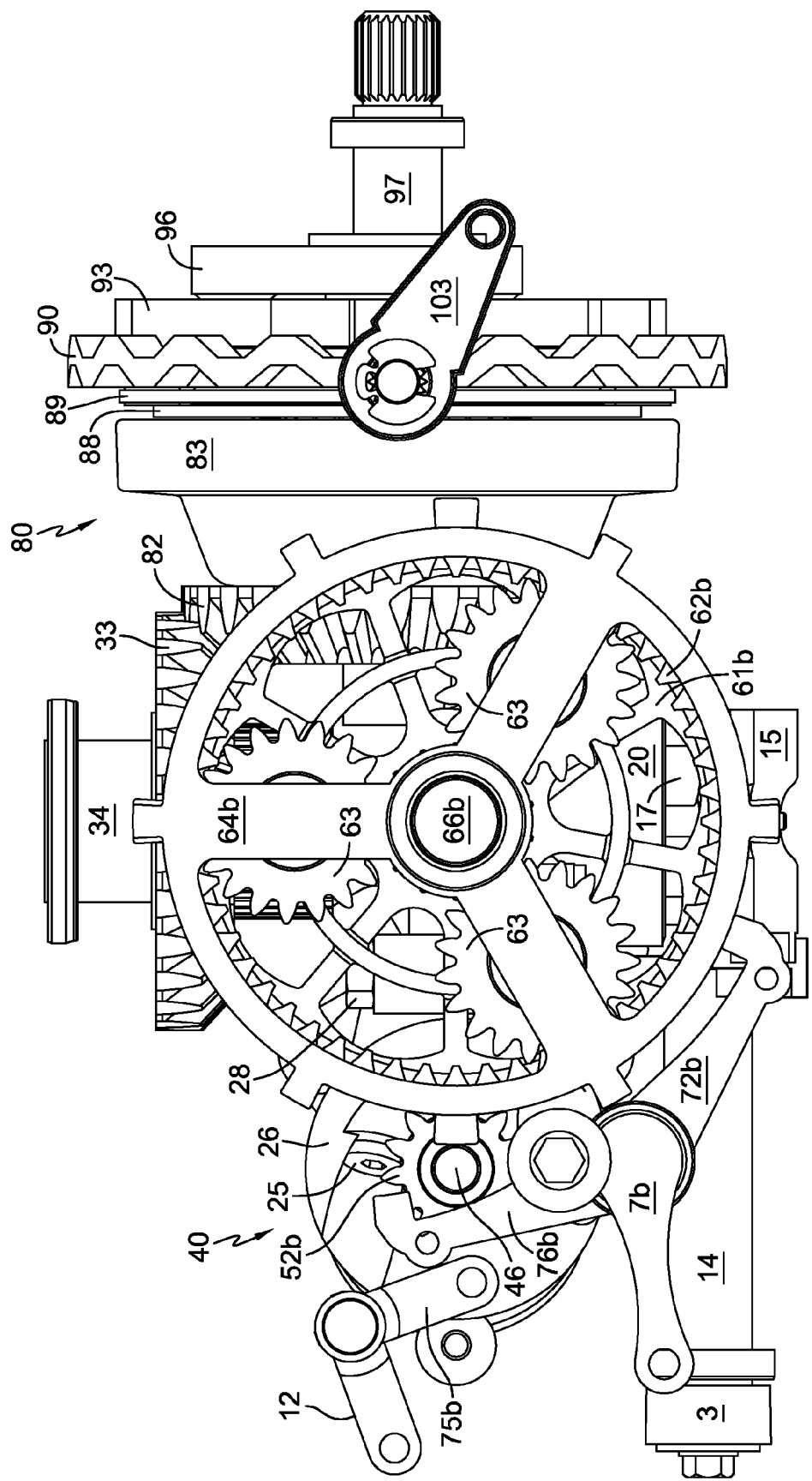
FIG. 11 is a side elevational view of the drive assembly of FIG. 2, similar to FIG. 4, but from the opposite side and with the external housings removed.
Figure 12:
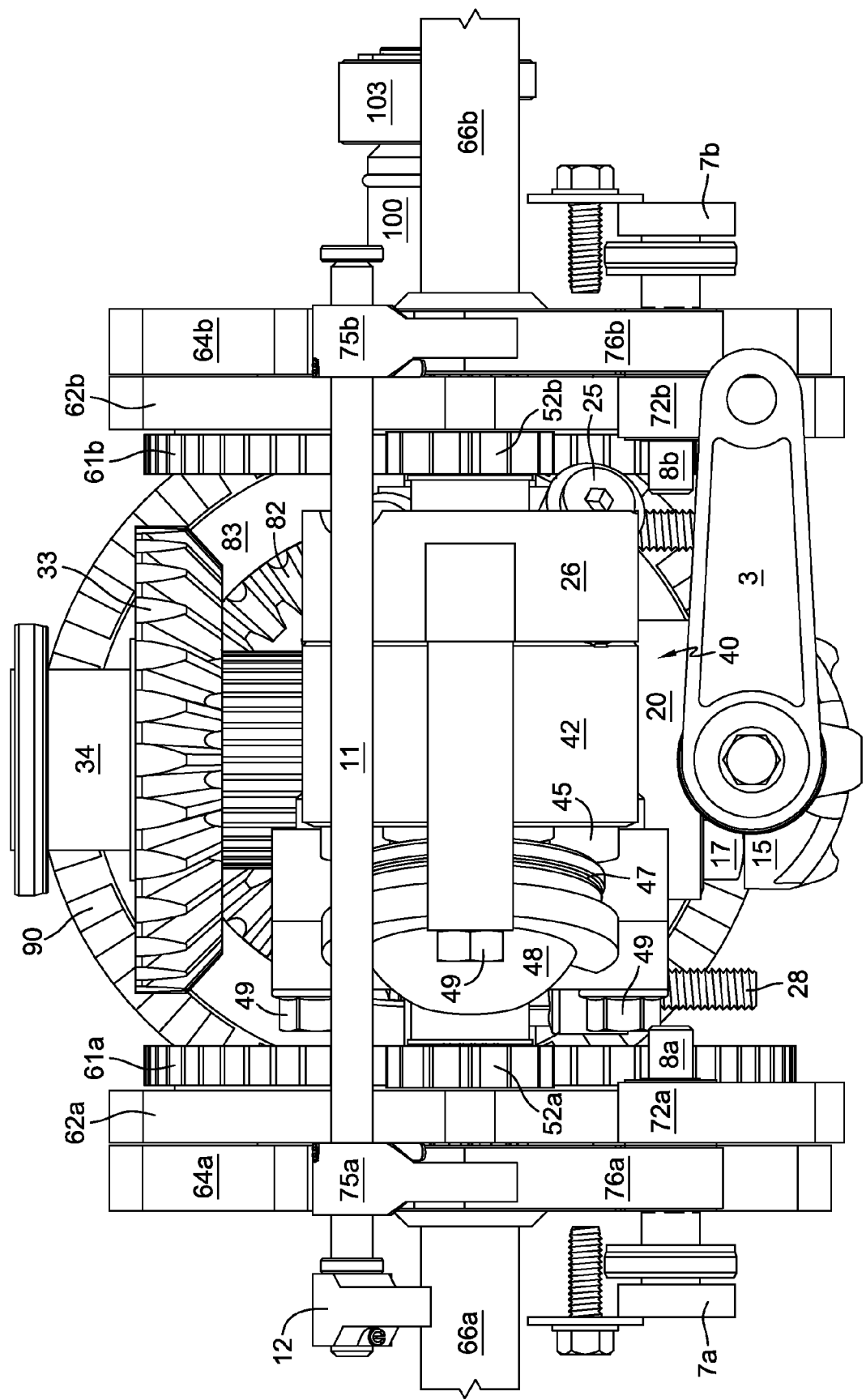
FIG. 12 is a rear elevational view of the drive assembly of FIG. 2 with the external housings removed.

Pump shaft 30 extends through center section 26 to engage and drive pump cylinder block 20, as shown in cross-section in, e.g., FIG. 6. Pump cylinder block 20 is rotatably disposed on a running surface 26a (which can be seen in, e.g., FIGS. 20 and 22) of center section 26. The output of pump cylinder block 20 and its axial pistons 17 is controlled by the rotational and arcuate movement of trunnion arm 14 and swash plate 15, respectively. Trunnion arm 14 extends outside main housing 1 to be controlled by the previously mentioned linkages 140 through control arm 3, which is engaged to and rotates with trunnion arm 14. It will be understood that a running surface can also incorporate a valve plate disposed between the cylinder block and the center section.

Motor cylinder block 42 is rotatably disposed on a running surface 26b of center section 26 and is hydraulically connected to pump cylinder block 20 through hydraulic porting and fluid passages formed internal to center section 26. Check plugs or seats 23 and associated check balls 24 are disposed in center section 26 to permit fluid exchange between sump 55 and the internal fluid passages. Additional fluid passage ports 29 may be formed during casting of center section 26; in the depicted embodiment, ports 29 are closed by means of passage plugs 25. With some minor modification to center section 26, shock valves or the like may be substituted for passage plugs 25 if deemed necessary or desirable for a particular working application of transaxle 122.

Motor cylinder block 42 uses axial pistons 45 and drives motor shaft 46 with pistons 45 engaging a thrust bearing 47 that is supported by thrust bearing support 48. Bearing support 48 is attached to center section 26 via fasteners 49. Although 3-point mounting is illustrated, the number of fasteners 49 and attachment points used to secure bearing support 48 to center section 26 can be modified as needed to ensure function and durability of assembly 40. Motor shaft 46 extends through motor cylinder block 42, center section 26, and bearing support 48, and has pinion gears 52a, 52b disposed on either end thereof so that the single motor shaft 46 powers both output axles independently and without need of a differential, in order to provide zero turn capability in a compact design. As can be seen in, e.g., FIGS. 7 and 21, motor shaft 46, pinion gears 52a and 52b, thrust bearing 47 and motor cylinder block 42 with its associated components such as pistons 45, for example, are all supported by the fastener-joined combination of center section 26 and bearing support 48 in a compact arrangement which also facilitates ease of assembly and servicing. Motor and center section assembly 40 is attached to main housing 1 by fasteners 28.

A planetary gear arrangement is used to provide the proper reduction from motor shaft 46 to the ultimate output of axle shaft 66b. More specifically, pinion gear 52b is engaged to and drives a combination spur gear 61b, which includes a gear form 67b acting as a sun gear for the planetary gear drive. Planet carrier 64b includes a plurality of pins with a planet gear 63 disposed on each of the pins. Each planet gear 63 runs on the internal gear surface of ring gear 62b. It will be understood that the gearing for axle shaft 66a is preferably identical.

This drive apparatus incorporates a unique clutch dog driving system which permits independent control of the output of the two axle shafts 66a, 66b to provide zero turn capability to the unit, as shown most clearly in FIGS. 7-13. A "dead man" or operator presence mechanism is also provided and will be described in detail below.

Each axle shaft 66a, 66b is splined or otherwise fixed directly to and driven by its respective planet carrier 64a, 64b. In the figures, the different sides are labeled using "a" and "b" to indicate the different sides of the unit, but for clarity these suffixes will not be used in the following description of the clutch dog mechanism except if necessary to point out differences in the two sides or to otherwise facilitate understanding.

Each clutch system comprises a shaft 8 having a handle 7 secured thereto; in the depicted embodiment the shaft 8 and handle 7 are integrally formed as a single unit. Each handle 7a, 7b is engaged via portions of linkages 140 to a separate operator control, thereby permitting the user to alternately rotate the two shafts 8a, 8b in different directions or the same direction to provide independent control of the left and right sides of the vehicle. Each handle 7 is retained by a washer which is retained by a fastener engaged to main housing 1, as shown, e.g., in FIG. 2. This method of retaining handle 7 allows a simple design and installation while permitting handle 7 to rotate as allowed by the range of motion of linkages 140 and/or by stop features (not shown) formed on main housing 1 and/or handle 7.

On each side of the unit, outer dog 76 and inner dog 72 are mounted on shaft 8 and rotate together. In general terms, outer dog 76 is capable of engaging and preventing rotation of planet carrier 64 by engaging one of a plurality of stops 78 formed on an outer surface of planet carrier 64 and acting as an engagement mechanism to thereby provide a braking force to axle 66, and inner dog 72 is capable of engaging and preventing rotation of ring gear 62 by engaging one of a plurality of stops 77 formed on an outer surface of ring gear 62 and acting as an engagement mechanism to thereby provide drive force to axle 66. The operation of this clutch apparatus, which permits the user to independently control the two wheels, is shown in, e.g., FIGS. 8 and 9, which both show inner dogs 72 in the engaged, or drive position, as will be described below.

When shaft 8 is rotated in a first direction so that inner dog 72 engages ring gear 62, ring gear 62 is precluded from rotating. The rotational force of planet gears 63 on the inner gear form of ring gear 62 therefore causes planet carrier 64 to rotate, thus driving axle 66. When shaft 8 is rotated in the opposite direction, inner dog 72 will disengage from ring gear 62. When shaft 8 rotates to a position where inner dog 72 is disengaged from ring gear 62 and outer dog 76 is not yet engaged to planet carrier 64, axle 66 will be considered to be in a neutral position.

As shaft 8 continues its rotation in this opposite direction, outer dog 76 will eventually engage planet carrier 64, thereby precluding planet carrier 64 from rotating so that the rotational force of the motor output as transmitted through planet gears 63 simply causes ring gear 62 to rotate. Thus, in this position, axle 66 does not rotate and that side of the unit is in the stopped or braked position. It can be seen that the user can alternatively place one side in drive and the other in a braked or neutral position in order to achieve zero turn capability. Each side may be biased toward the position in which inner dog 72 is engaged to ring gear 62 by means of a spring (not shown).

The operator presence function is provided by a brake cam control arm 12 engaged to a rotatable brake cam mounting shaft 11 and a pair of brake engagement cams 75 pinned or otherwise secured to rotatable shaft 11. Brake cam control arm 12 is engaged to an external linkage as part of linkages 140. Each cam 75 engages one of the outer dogs 76 and may be biased by means of a spring (not shown) to the engaged position in a manner so as to force outer dog 76 into engagement with planet carrier 64 to prevent rotation of axles 66.

When brake cam control arm 12 is engaged by the operator, it overcomes this bias force to disengage cams 75 from the two outer dogs 76. Since this is a "dead man" type switch, both cams 75 are in the same engaged or disengaged position at the same time. Only when brake cam control arm 12 is so engaged by the user can the clutch steering shafts 8 be rotated to either the drive, braked or neutral positions as described above. Furthermore, due to the geometry of the unit, the bias force on brake cam control arm 12 will be greater than the bias force on the separate shafts 8a and 8b on which dogs 72 and 76 are disposed, so that the unit will generally be biased to a position where the outer dogs 76 are in the engaged position and both sides of the unit are stopped.

Turning to the PTO assembly 80, as shown in, e.g., FIG. 6, the vertical output of prime mover 121 also powers the PTO shaft 97 to power auger 124. Portions of PTO assembly 80 are housed in PTO cover 99 which is secured to main housing 1. A first bevel gear 33 receives rotational force from input tube 34 and drives a second bevel gear 82 which also has an internal gear form engaged to and driving clutch cage 83.

PTO assembly 80 also includes a planetary gear set and more particularly ring gear 93 and a plurality of planet gears 94 mounted on pins on planet carrier 96, with PTO shaft 97 splined or otherwise fixed to and driven by planet carrier 96. As seen in, e.g., FIGS. 6 and 14, a plurality of clutch plates 84 and friction clutch plates 85 are sandwiched together and captured in cage 83 to transmit rotational force from cage 83 to sun gear 86 when the clutch is actuated.

Figure 13:
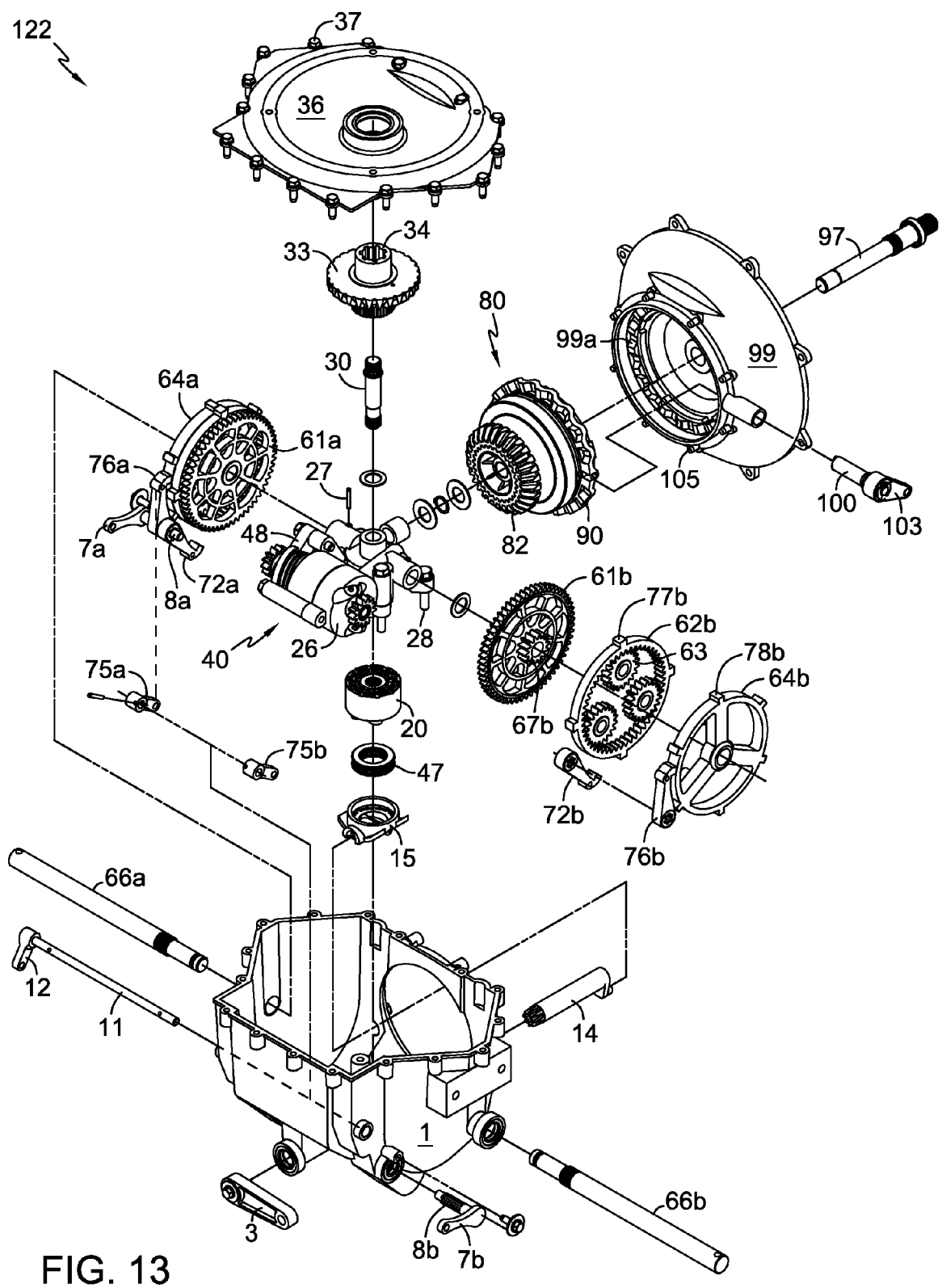
FIG. 13 is an exploded perspective view of certain components and component groupings of the hydrostatic and drive portions of the drive assembly of FIG. 2.
Figure 14:
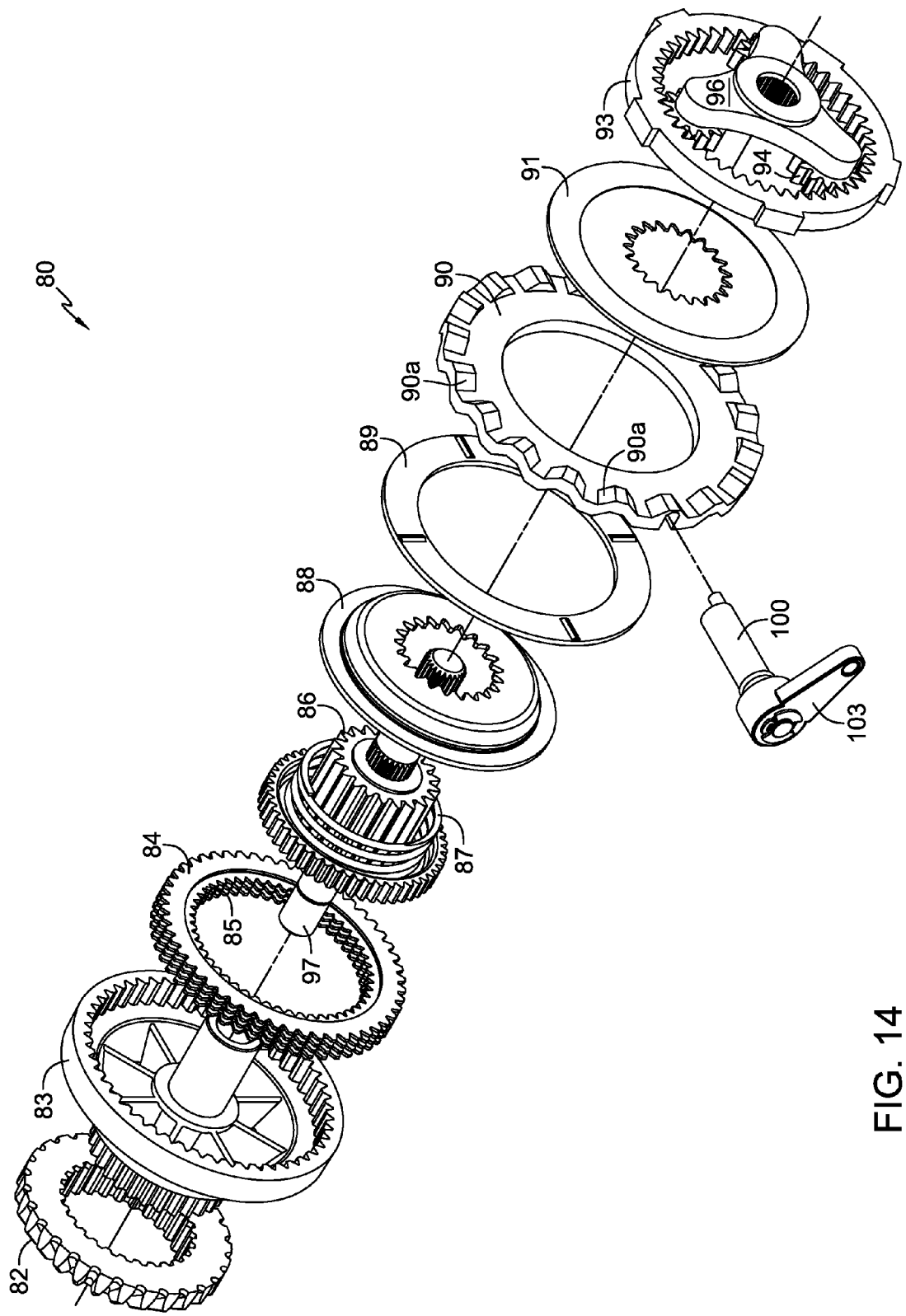
FIG. 14 is an exploded perspective view of certain components of the PTO assembly of the drive assembly of FIG. 2.

The clutch is externally actuated by cam shaft 100 engaged to and actuated by handle 103, which can be attached to the linkages 140 previously discussed. Rotation of activation plate 90 to an activated position moves activation plate 90 and thrust bearing 89 axially toward cage 83, transmitting force through thrust washer 88, compressing clutch plates 84 and 85, which are captured in cage 83. This compression and the resulting frictional engagement of clutch plates 84 and 85 permits the axial rotation of cage 83 to be transmitted through to sun gear 86, which is mounted on and rotates freely with respect to PTO shaft 97. The previously mentioned axial movement of activation plate 90 is accomplished by the interface of a plurality of ramps 90a formed on activation plate 90 with similar mating ramps 99a formed on PTO cover 99, as shown in FIG. 13.

The PTO clutch assembly also includes a brake plate 91 slidably mounted on sun gear 86 and engaging ring gear 93 to provide a braking force thereto. Brake plate 91 is biased into the engaged position by spring 87 acting through thrust washer 88. Thus, the aforementioned axial movement of thrust bearing 89 and thrust washer 88 also acts to compress spring 87, removing the spring force from brake plate 91.

Figure 15:
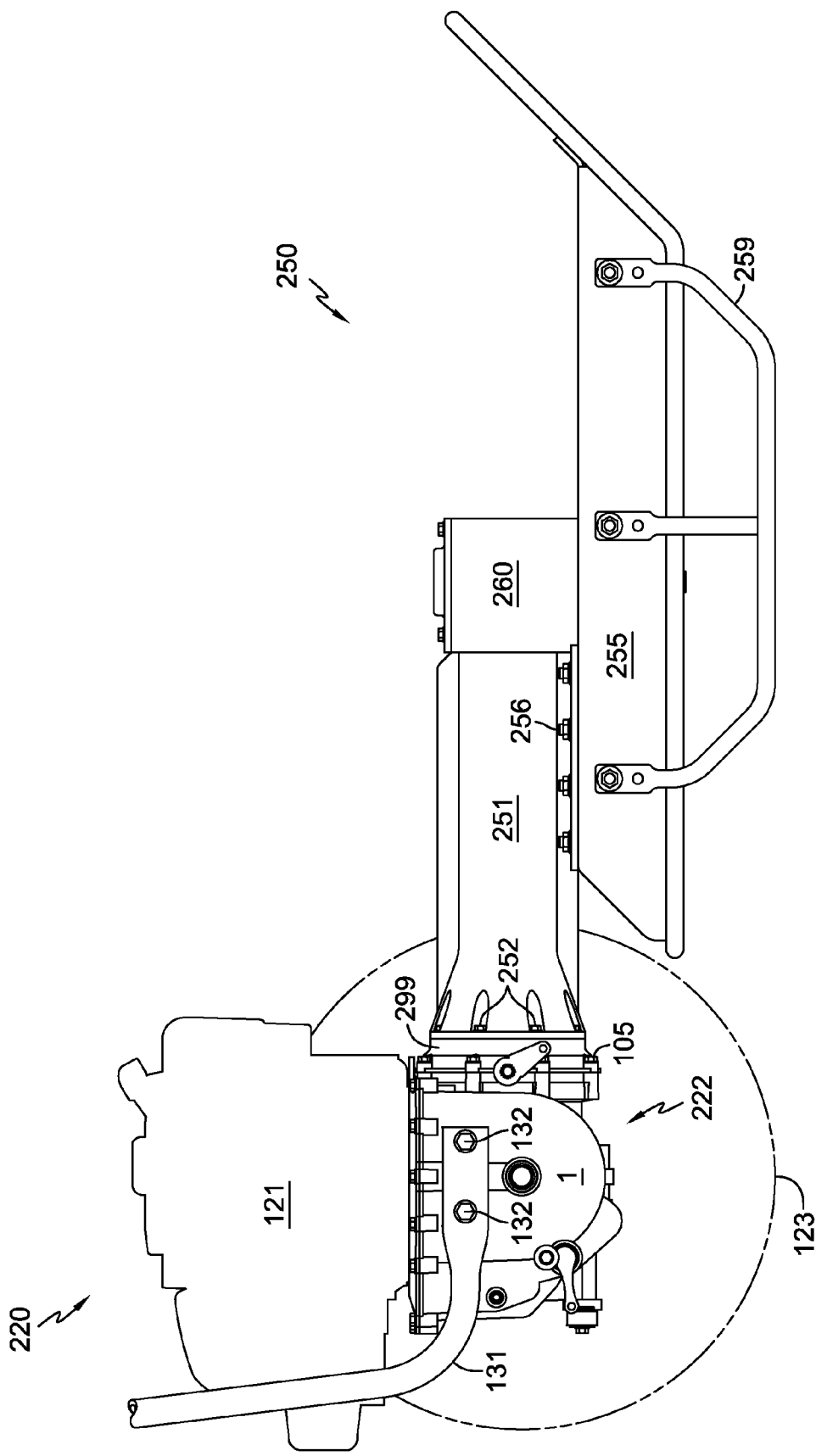
FIG. 15 is a side elevational view of a brush cutter incorporating a second embodiment of a drive assembly in accordance with the present invention.
Figure 16:
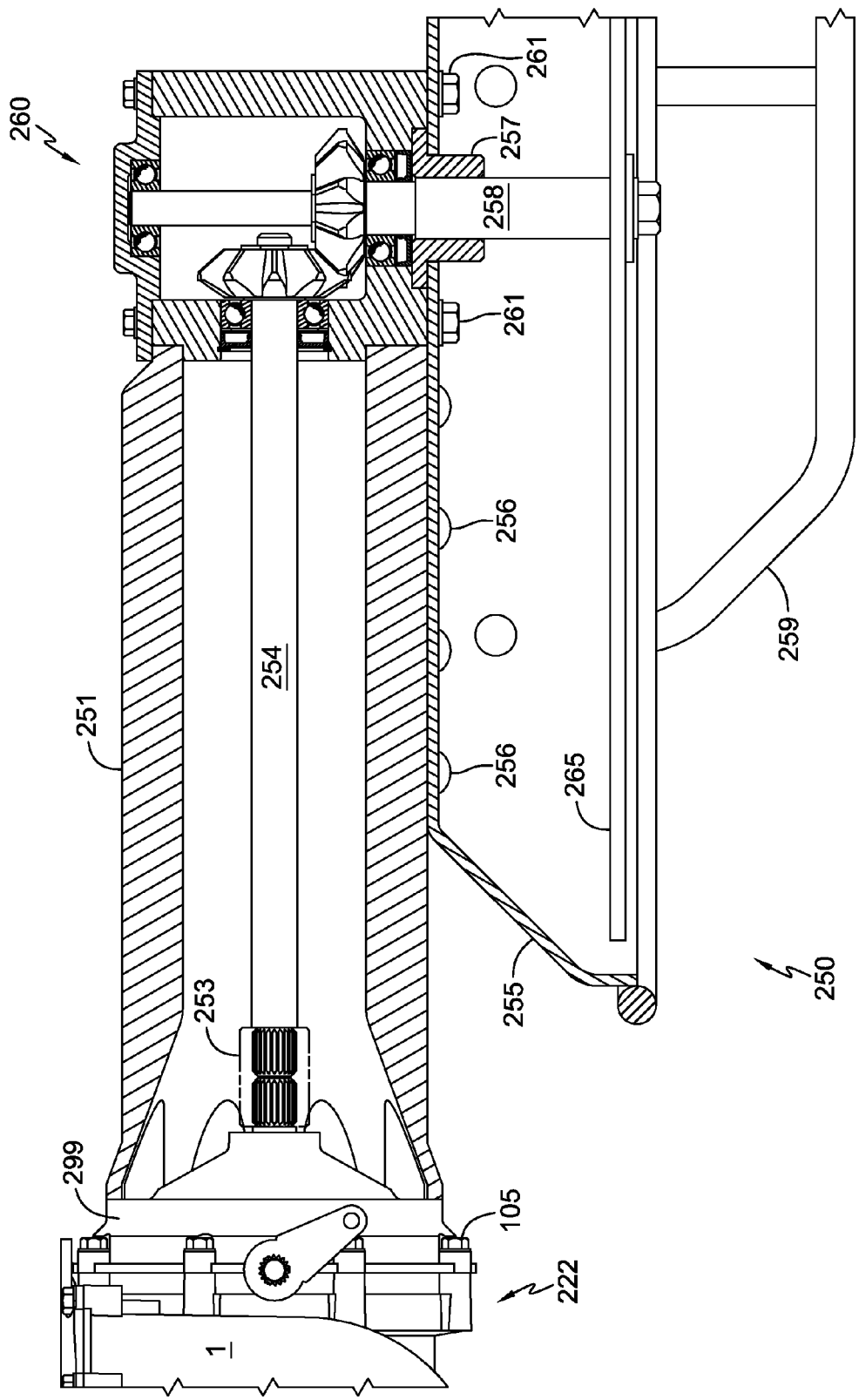
FIG. 16 is a portion of the side elevational view of FIG. 15 partially cut away to reveal certain details of the brush cutter deck drive.
Figure 17:
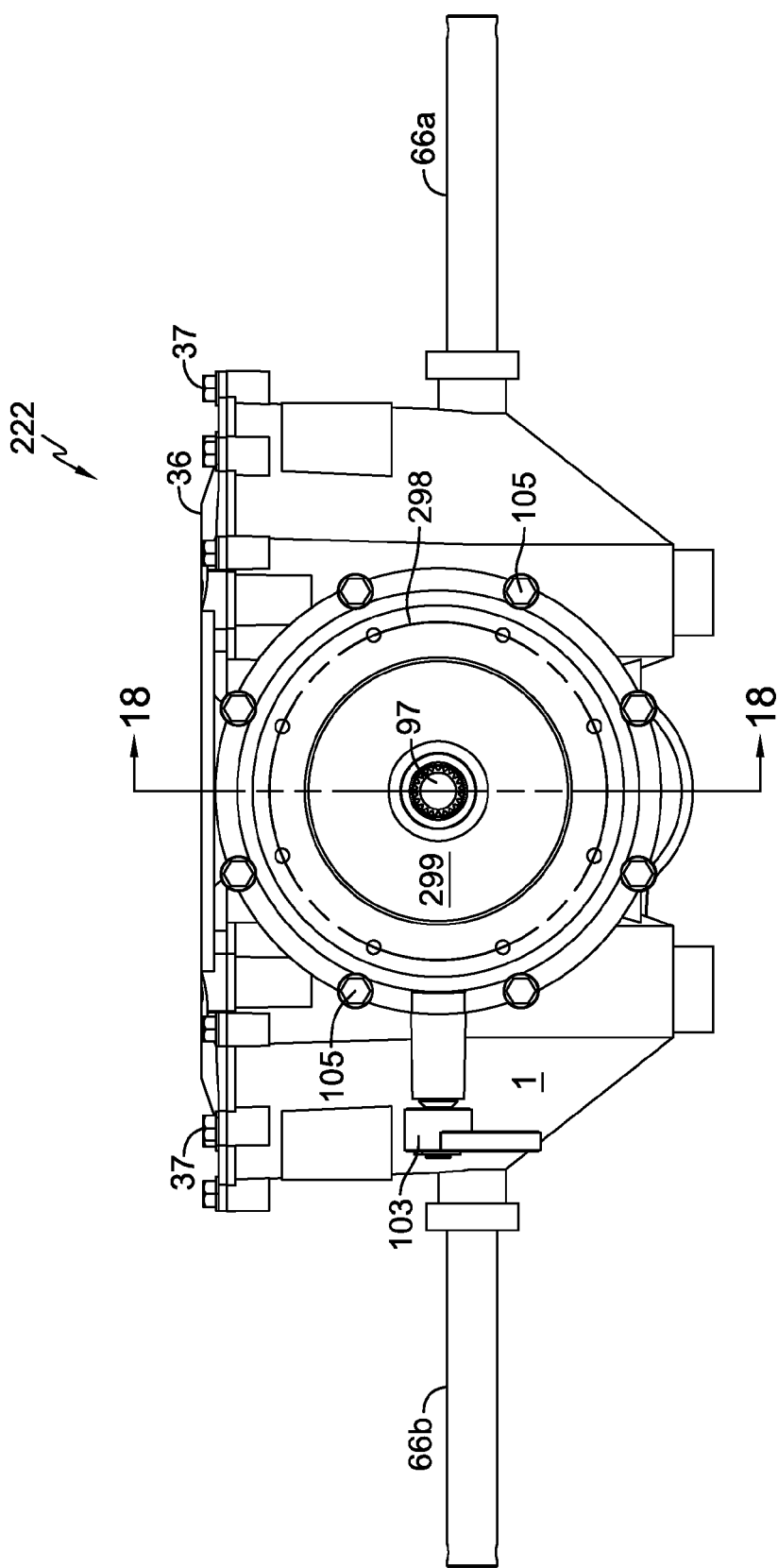
FIG. 17 is a front elevational view of the drive assembly of FIG. 15.
Figure 18:
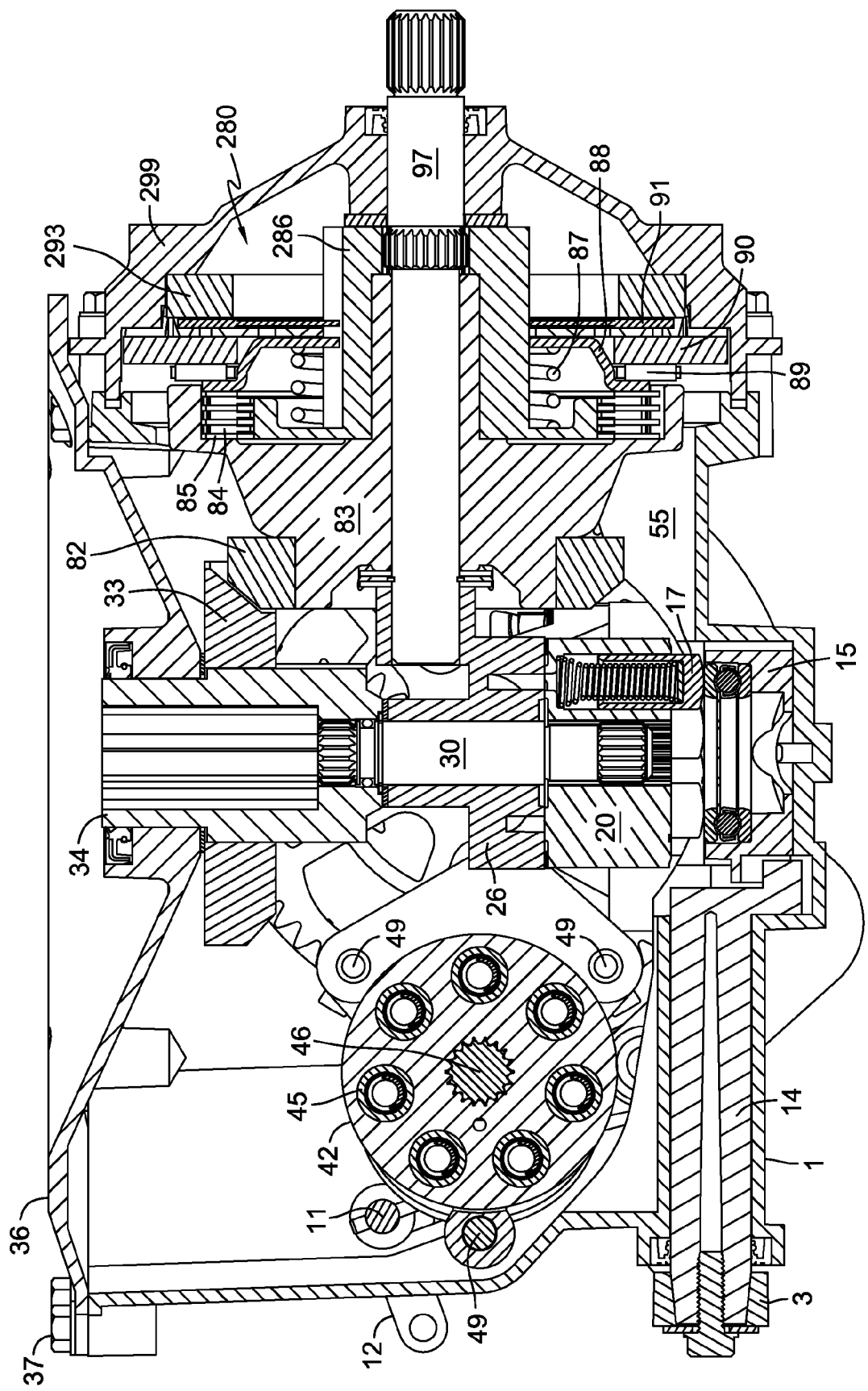
FIG. 18 is a cross-sectional view of the drive assembly of FIG. 15 along the line 18-18 in FIG. 17.
Figure 20:
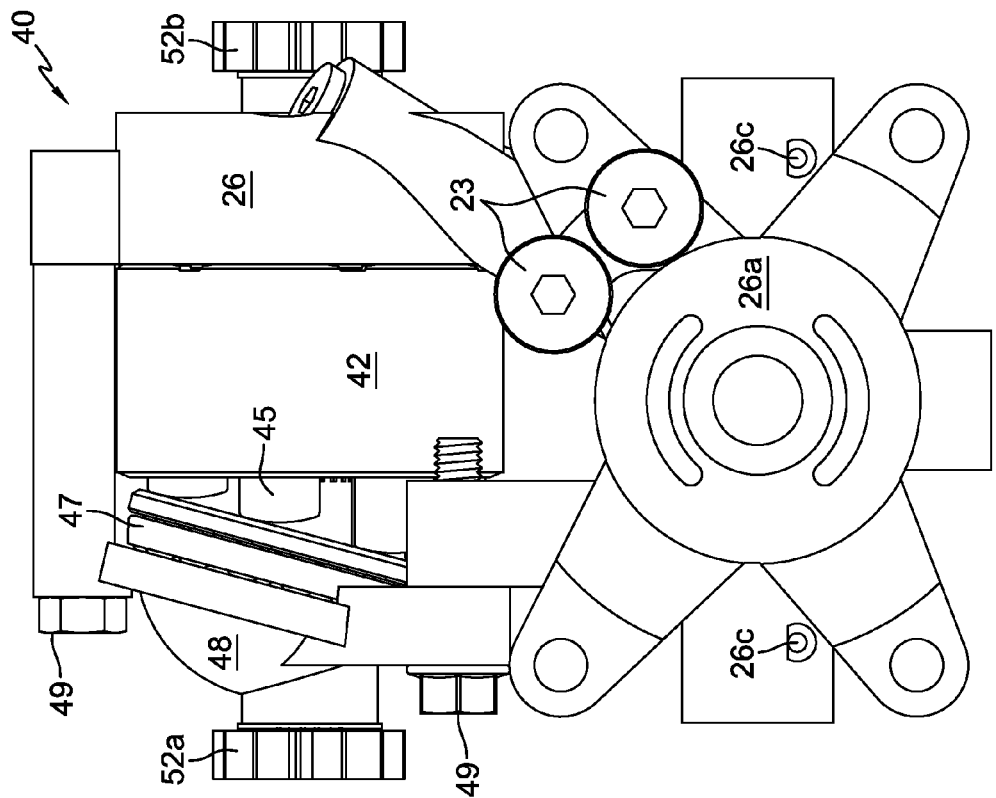
FIG. 20 is a bottom plan view of the center section and motor assembly of FIG. 19.
Figure 19:
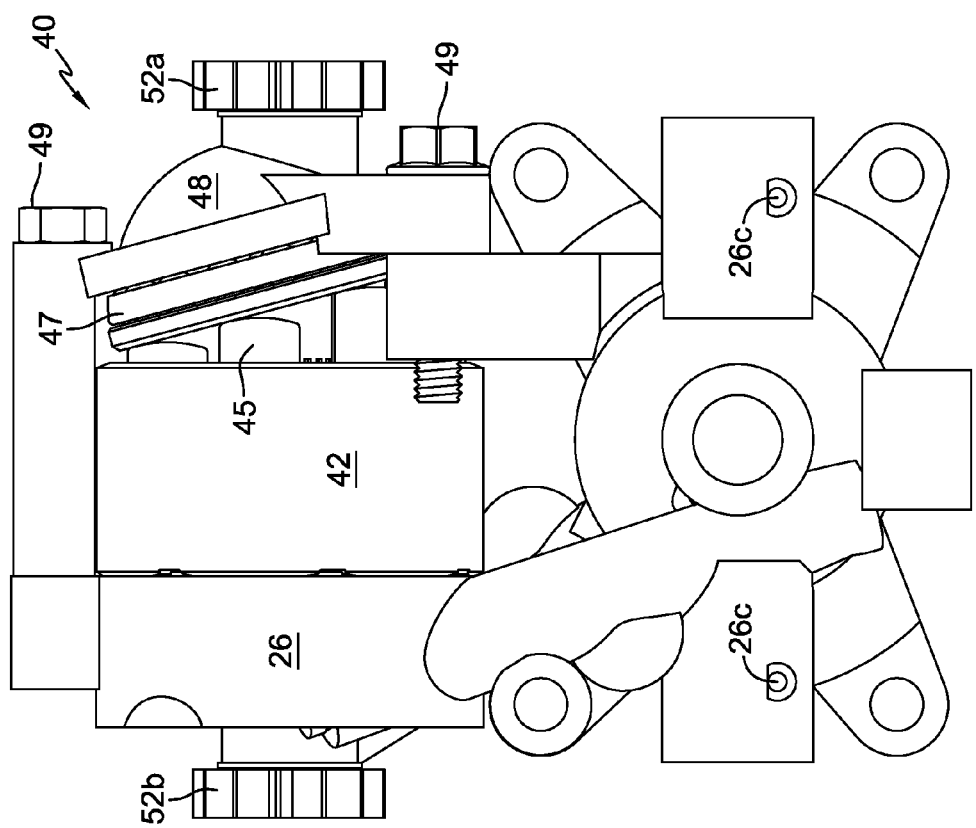
FIG. 19 is a top plan view of an exemplary center section and motor assembly for use in the drive assemblies disclosed herein.
Figure 21:
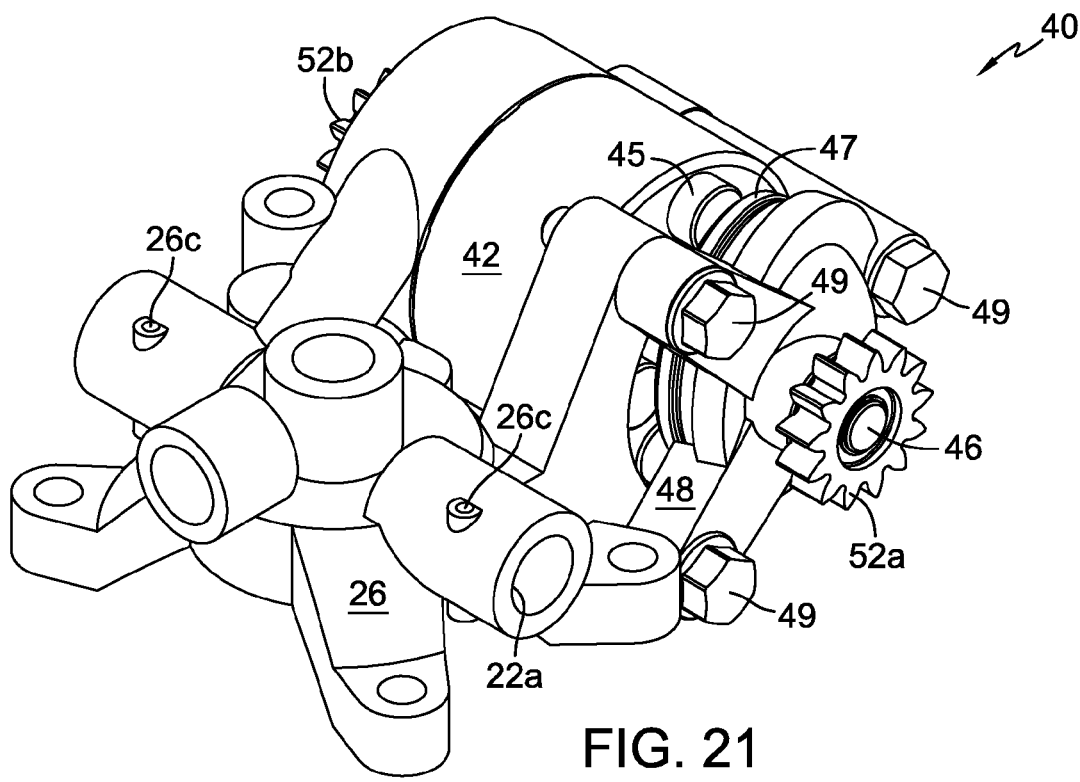
FIG. 21 is a top perspective view of the center section and motor assembly of FIG. 19.
Figure 22:
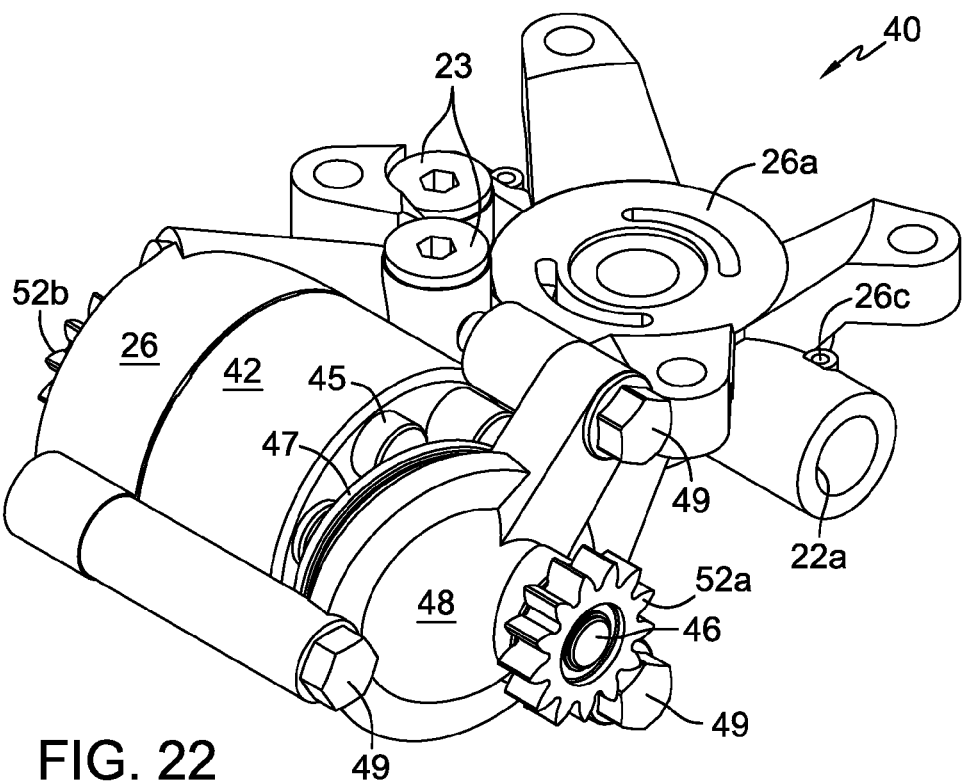
FIG. 22 is a bottom perspective view of the center section and motor assembly of FIG. 19.
Figure 23:
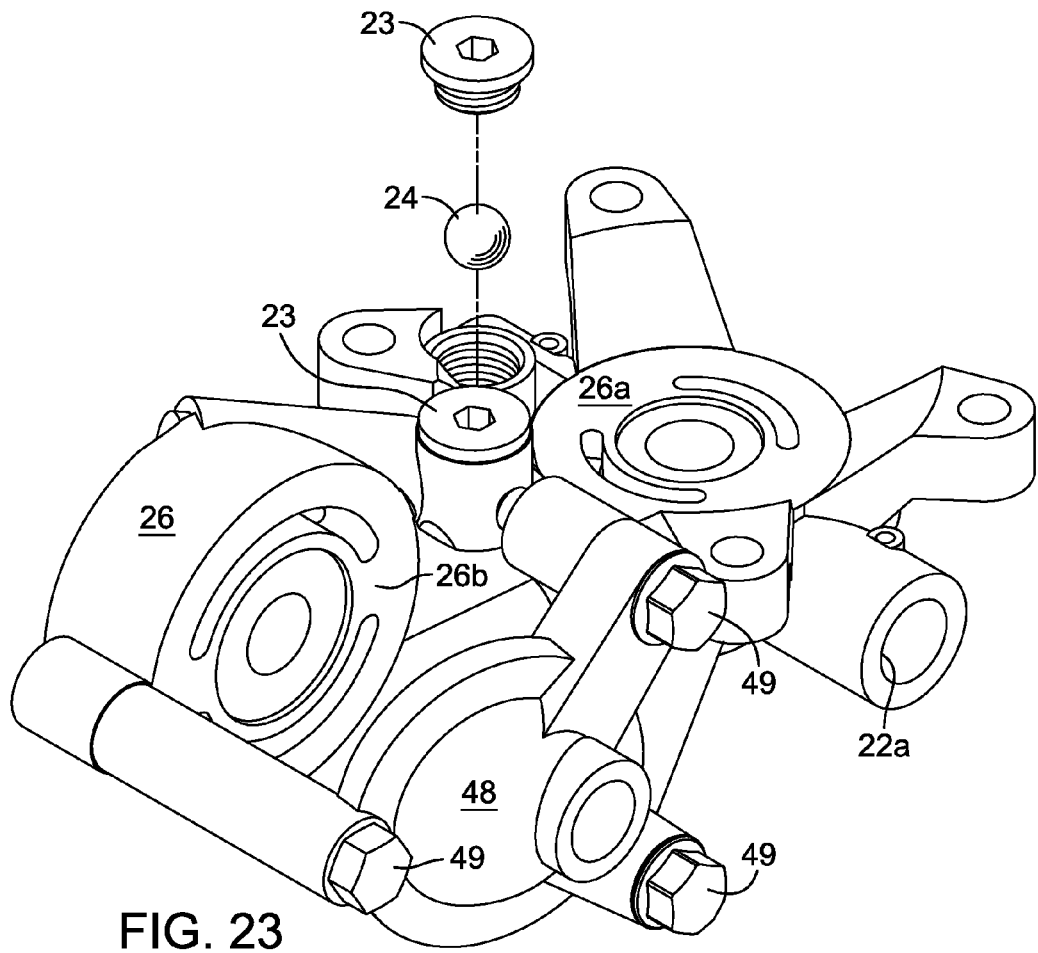
FIG. 23 is a partially exploded bottom perspective view of the center section and motor assembly of FIG. 19 with the motor components removed.
Figure 24:
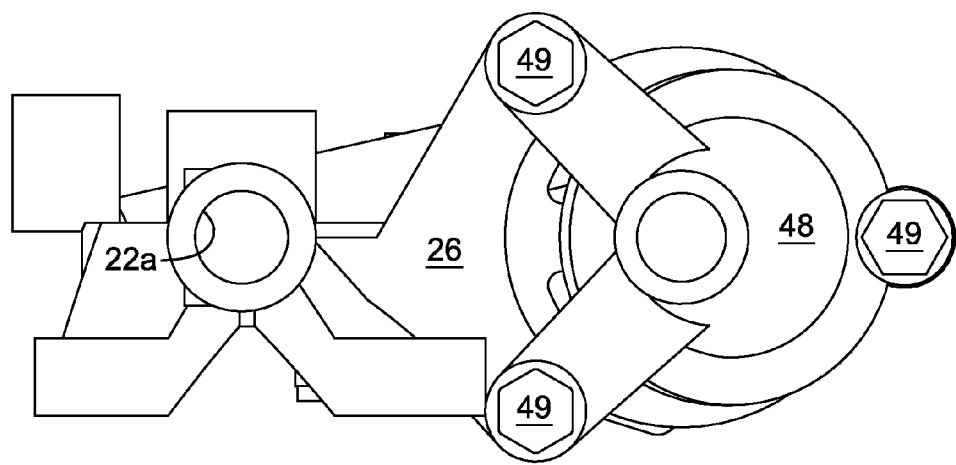
FIG. 24 is a side elevational view of the center section and motor assembly of FIG. 19 with the motor components removed.
Figure 25:
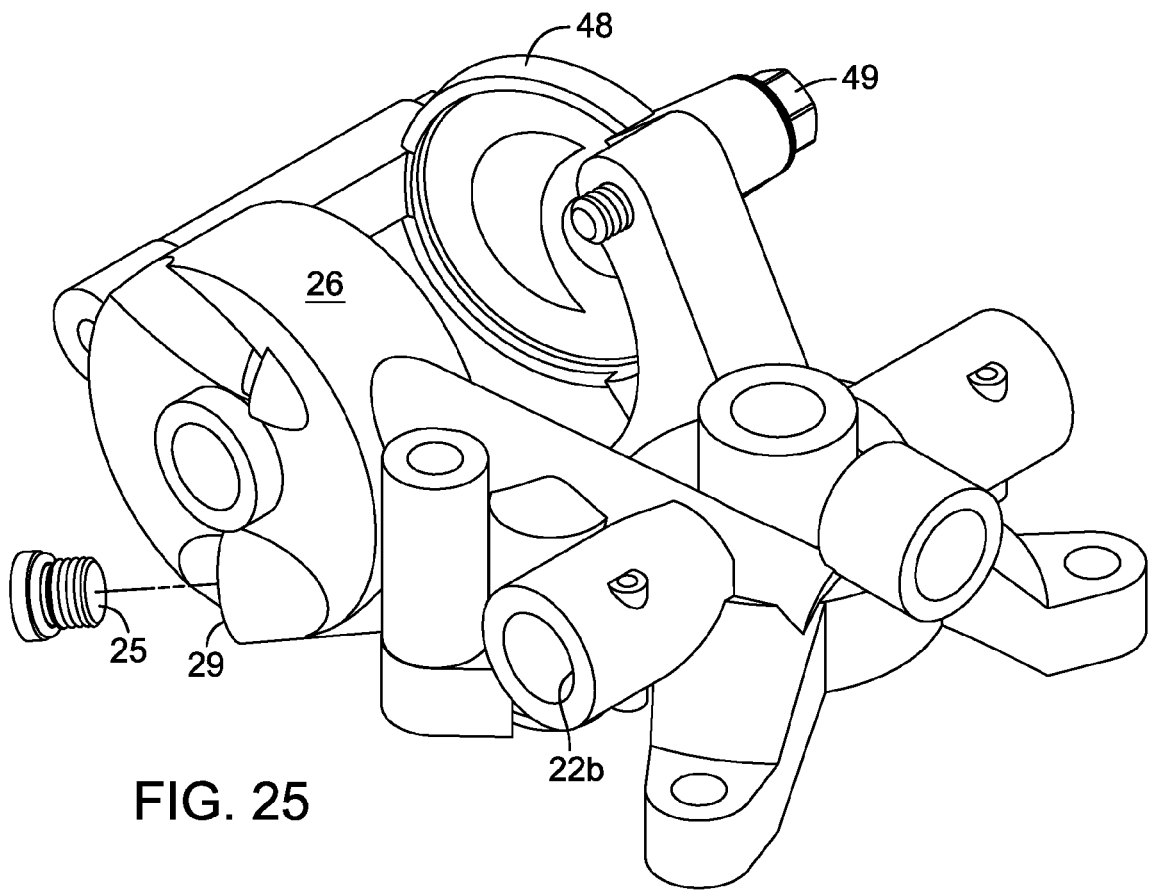
FIG. 25 is a partially exploded top perspective view of the center section and motor assembly of FIG. 19 with the motor components removed.
Figure 26:
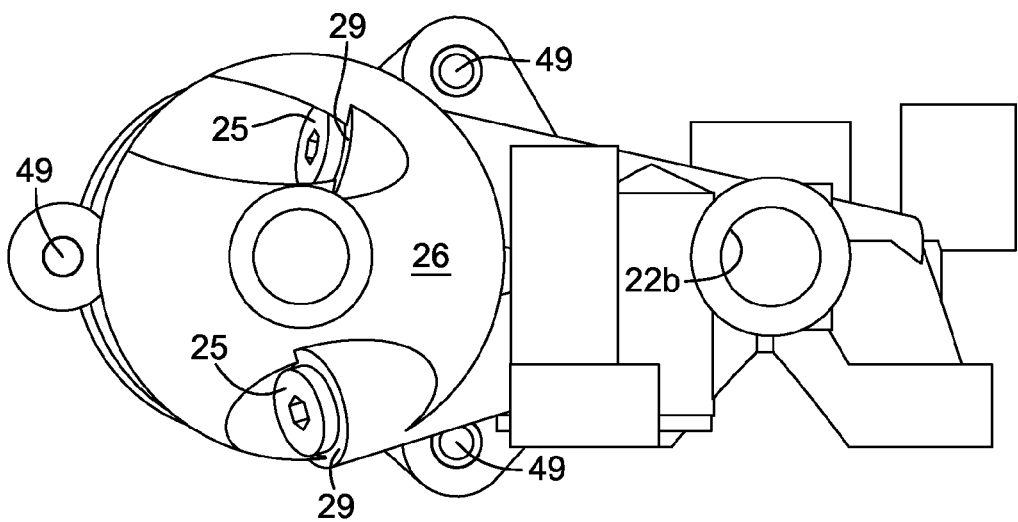
FIG. 26 is a side elevational view of the center section and motor assembly of FIG. 19 with the motor components removed, similar to FIG. 24, but from the opposite side.

A transaxle assembly 222 and brush cutter vehicle 220 in accordance with a second embodiment of this invention are illustrated in FIGS. 15-18. FIG. 15 depicts portions of a brush cutter vehicle 220 which may be controlled in basically the same manner as vehicle 120 shown in FIG. 1. The control panel 130 and linkages 140 shown in FIG. 1 have been omitted in FIG. 15 and just one of two wheels 123 is shown in phantom so that the frameless aspect of vehicles or mobile equipment enabled by the transaxle embodiments described herein can be illustrated more clearly. The second embodiment transaxle 222, like transaxle 122, is a variable speed transaxle with integrated PTO assembly 280. As shown in FIGS. 16-18, however, PTO assembly 280 does not include the PTO planetary reduction gears. Sun gear 86 of PTO assembly 80 has been replaced with brake disc carrier 286, which is splined or otherwise fixed to and drives PTO shaft 97. Also, PTO ring gear 93 has been replaced with a brake wear ring or spacer 293. PTO cover 299 comprises a bolt circle 298 for interchangeable attachment of various equipment modules. This transaxle design therefore permits the transformation of a transaxle including PTO reduction gearing into one without such PTO reduction gearing by means of the simple deletion and exchange of these few components, demonstrating the manufacturing and application versatility of this configuration. Furthermore, other PTO covers (not shown) comprising smaller or larger bolt circles or equipment module mounting patterns other than circular, may be interchangeably substituted in like manner for either of the PTO covers 99 or 299.

A brush cutter module 250 is illustrated in FIGS. 15 and 16 to provide an example of a unique equipment module which may be attached to transaxle 222 in the production of brush cutter vehicle 220. The entire brush cutter module 250 may be preassembled and completely finished prior to its simple attachment to transaxle 222. PTO shaft 97 is engaged to input shaft 254 of brush cutter module 250 with a simple slide-fit coupling 253 which is constrained by the relative positioning of these two shafts when module 250 is attached to transaxle 222. Shaft housing 251 of module 250 is a structural component attached to the PTO cover 299 by a plurality of fasteners 252. Upon attachment of module 250, as shown in FIGS. 15 and 16, shaft housing 251 extends from transaxle 222 to serve as a support structure for the attached brush cutter mowing deck 255.

The brush cutter module 250 configuration also includes right-angle gearbox 260 comprising a main housing, cover, fasteners, shaft bearings, seals, bevel gears and ends of both input shaft 254 and output shaft 258. As shown in FIG. 16, gearbox 260 can include features which interface with an end of shaft housing 251 so that gearbox 260 and shaft housing 251 are interlocked when they are attached to deck 255 by means of fasteners 256 and 261, respectively. This interlocking or slide-fit interface adds structural strength to module 250, precludes operator contact with the rotating shafts located inside shaft housing 251, and prevents excessive wear from environmental contamination of the seals and shaft/coupling mating surfaces which are protected inside shaft housing 251. Brush cutter module 250 also includes a cutting blade 265 and blade attachment hardware which may include a blade adapter (not shown) with one or more shear pins (not shown) to protect gears from damage if, for example, the blade encounters a solid object. Optionally or additionally, one or more shear pins may be incorporated at one or more gearbox 260 bevel gear-to-shaft interfaces. These, of course, would be designed to fail under a load less than that which would cause any significant damage to gear teeth in either of gearbox 260 or transaxle 222. Deck 255 may also comprise a shaft bushing 257 fixed to deck 255 for additional support of output shaft 258, and skids 259 which may be height-adjustable, as shown. Additional guards (not shown) may also be included with module 250 to protect the operator and others from objects propelled by the cutting blade. A skid plate and/or other guards (not shown) may also be attached or integrally added to the external housing of transaxle 222 and/or handle 131 to protect the operator and transaxle 222 and the various linkages and controls of transaxle 222 and vehicle 220, as deemed necessary and desirable for safety and durability. Safety features, such as the aforementioned guards may, of course, vary among different vehicle and equipment applications, and are not described in detail herein.

While certain features of this invention are unique to hydrostatic transaxles, it will be understood that other features are applicable to vehicle drives using other forms of variable speed transmissions. Also, while the drive assemblies depicted herein are shown in connection with a snow thrower using an auger or a brush cutting mower deck, it will be understood that this invention can be used with other driven vehicles or apparatuses.

The transaxle embodiments disclosed herein are designed for the interchangeable attachment of other equipment modules which can be driven by the PTO output. These other equipment modules may include gearing or other speed changing mechanisms specific to their application and function, so that a basic drive assembly embodiment may drive equipment modules of different operating speeds, such as a snow thrower and a mower. For example, the planetary reduction gearing associated with the PTO in the first embodiment could alternatively be included in a snow thrower module (not shown) such that the drive assembly of the second embodiment could drive either this snow thrower module or a brush cutter mowing deck, or it could drive other modules such as, e.g., a wood chipper, mobile generator, finish cut mowing deck, ground working device such as a tiller, etc. These interchangeable modules may include features such as 1:1 gearing, speed reduction gearing, speed increase gearing, or some other PTO output speed change mechanism, either variable or constant, as needed, to provide a proper operating speed or speed range of each module.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive apparatus for selectively driving a first axle shaft and a second axle shaft, comprising a first clutch assembly engaged to and selectively driving the first axle shaft and a second clutch assembly engaged to and selectively driving the second axle shaft, wherein each clutch assembly comprises:
    a spur gear driven by a pinion gear and a sun gear driven by the spur gear;
    a planet carrier engaged to one of the axle shafts and comprising a first plurality of stops on an outer surface thereof;
    a plurality of planet gears rotatably disposed on the planet carrier and engaged to and driven by the sun gear, each of the planet gears running on a gear form on an inner surface of a ring gear;
    a second plurality of stops on the outer surface of the ring gear;
    a first engagement means for selectively engaging one of the first plurality of stops to prevent rotation of the ring gear;
    a second engagement means for selectively engaging one of the second plurality of stops to prevent rotation of the planet carrier and thereby provide a braking force to the one axle shaft to which the planet carrier is engaged; and
    a control mechanism for selectively controlling the first engagement means and the second engagement means.

2. The drive apparatus of claim 1, wherein the control mechanism for the first clutch assembly and the control mechanism for the second clutch assembly each comprise a common shaft on which both the first engagement means and the second engagement means are mounted, and each control mechanism enables its respective clutch assembly to have a first position where the first engagement means is engaged to one of the first plurality of stops, a second position where the second engagement means is engaged to one of the second plurality of stops, and a third position where neither the first or second engagement means is engaged and the drive apparatus is in neutral.

3. The drive apparatus of claim 1, wherein the first engagement means comprises a first pivotable lever arm acting as a first clutch dog, and the second engagement means comprises a second pivotable lever arm acting as a second clutch dog.

4. A drive apparatus, comprising a variable speed apparatus driving a first gear assembly and a second gear assembly, a first axle shaft engaged to and driven by the first gear assembly and a second axle shaft engaged to and selectively driven by the second gear assembly, wherein each gear assembly comprises:
- a planet carrier engaged to one of the axle shafts and having a plurality of planet gears rotatably disposed thereon, the plurality of planet gears engaged to and driven by a ring gear;
- a first clutch dog for selectively engaging the ring gear, the first clutch dog having a first position where it is disengaged from the ring gear and a second position where it is engaged to the ring gear to prevent rotation thereof; and
- a second clutch dog for selectively engaging the planet carrier, the second clutch dog having a first position where it is disengaged from the planet carrier and a second position where it is engaged to the planet carrier to provide a braking force to the one axle shaft to which the planet carrier is engaged.

5. The drive apparatus of claim 4, wherein each gear assembly further comprises a control mechanism engaged to and selectively controlling both the first clutch dog and the second clutch dog.

6. The drive apparatus of claim 5, wherein each control mechanism comprises a common shaft on which both the first clutch dog and the second clutch dog are mounted, and each control mechanism enables its respective gear assembly to have a first status where the first clutch dog is in its second, engaged position, a second status where the second clutch dog is in its second, engaged position, and a third status where both the first clutch dog and the second clutch dog are in their first, disengaged positions, and the drive apparatus is in neutral.

7. The drive apparatus of claim 4, wherein the first and second gear assemblies are both disposed in a common housing.

8. The drive apparatus of claim 7, wherein the variable speed apparatus comprises a hydrostatic transaxle having a hydraulic pump and a hydraulic motor rotatably disposed in the common housing, and a motor shaft engaged to and driven by the hydraulic motor.

9. The drive apparatus of claim 8, further comprising a first pinion gear disposed on a first end of the motor shaft and a second pinion gear disposed on a second end of the motor shaft, a first spur gear driven by the first pinion gear and a second spur gear driven by the second pinion gear, and a first sun gear driven by the first spur gear and a second sun gear driven by the second spur gear, wherein the first sun gear and the second sun gear each drive at least one of the plurality of planet gears of one of the first and second gear assemblies.

10. The drive apparatus of claim 4, further comprising a pair of brake engagement cams, each brake engagement cam engaged to one of the second clutch dogs to bias both of the second clutch dogs to its second, engaged position.

11. The drive apparatus of claim 4, wherein the ring gear comprises an inner surface on which a gear form is disposed and an outer surface on which a first plurality of stops is disposed, whereby the first clutch dog engages the first plurality of stops when the first clutch dog is in its second, engaged position.

12. The drive apparatus of claim 11, wherein the planet carrier comprises an outer surface on which a second plurality of stops is formed, whereby the second clutch dog engages the second plurality of stops when the second clutch dog is in its second, engaged position.

13. A clutch and planet gear drive assembly for selectively driving an axle shaft, comprising:
- a ring gear comprising a gear form and having a plurality of planet gears running on the gear form;
- a planet carrier engaged to the axle shaft, wherein each of the plurality of planet gears are disposed on the planet carrier;
- a sun gear engaged to and driving the plurality of planet gears;
- a first clutch dog selectively engageable to a first engagement structure to prevent rotation of the ring gear; and
- a second clutch dog selectively engageable to a second engagement structure to prevent rotation of the planet carrier and thereby provide a braking force to the axle shaft.

14. The assembly of claim 13, further comprising a control mechanism for controlling the first clutch dog and the second clutch dog.

15. The assembly of claim 14, wherein the control mechanism has a first status, where the first clutch dog is engaged to the first engagement structure and the second clutch dog is disengaged from the second engagement structure, a second status where the second clutch dog is engaged to the second engagement structure and the first clutch dog is disengaged from the first engagement structure, and a third status where the first clutch dog and the second clutch dog are both disengaged from their respective engagement structures and the assembly is in neutral.

16. The assembly of claim 14, wherein the control mechanism comprises a common shaft on which both the first clutch dog and the second clutch dog are mounted.

17. The assembly of claim 16, wherein the first clutch dog comprises a first rotatable lever arm having a first end disposed on the common shaft and a second end engageable with the first engagement structure, and the second clutch dog comprises a second rotatable lever having a first end disposed on the common shaft and a second end engageable with the second engagement structure.

18. The assembly of claim 13, wherein the ring gear comprises an inner surface on which the gear form is disposed and an outer surface on which the first engagement structure is disposed.

19. The assembly of claim 13, wherein the first engagement structure comprises a first plurality of stops formed on an outer surface of the ring gear, and the second engagement structure comprises a second plurality of stops formed on an outer surface of the planet carrier.

20. The assembly of claim 19, further comprising a control mechanism engaged to and selectively controlling both the first clutch dog and the second clutch dog.

21. The assembly of claim 20, wherein the control mechanism comprises a common shaft on which both the first clutch dog and the second clutch dog are mounted, and the control mechanism enables the assembly to have a first position where the first clutch dog is engaged to one of the first plurality of stops and the second clutch dog is disengaged from the second plurality of stops, a second position where the second clutch dog is engaged to one of the second plurality of stops and the first clutch dog is disengaged from the first plurality of stops, and a third position where both the first clutch dog and the second clutch dog are disengaged from their respective plurality of stops and the assembly is in neutral.

* * * * *